US010015326B2

(12) United States Patent
Sato

(10) Patent No.: US 10,015,326 B2
(45) Date of Patent: Jul. 3, 2018

(54) IMAGE FORMING APPARATUS, AUTOMATIC INSTALLATION METHOD FOR EFFICIENTLY INSTALLING AN IMAGE FORMING APPARATUS, AND STORAGE MEDIUM

(71) Applicant: CANON KABUSHIKI KAISHA, Tokyo (JP)

(72) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 14/792,048

(22) Filed: Jul. 6, 2015

(65) Prior Publication Data

US 2016/0006886 A1    Jan. 7, 2016

(30) Foreign Application Priority Data

Jul. 7, 2014    (JP) .................................. 2014-140002

(51) Int. Cl.
*H04N 1/00* (2006.01)
*H04N 1/32* (2006.01)
*G06Q 30/00* (2012.01)

(52) U.S. Cl.
CPC ....... *H04N 1/00087* (2013.01); *H04N 1/0009* (2013.01); *H04N 1/0097* (2013.01); *H04N 1/00244* (2013.01); *H04N 1/00344* (2013.01); *H04N 1/00965* (2013.01); *H04N 1/32085* (2013.01); *H04N 1/32117* (2013.01); *H04N 1/32122* (2013.01); *G06Q 30/00* (2013.01)

(58) Field of Classification Search
None
See application file for complete search history.

(56) References Cited

U.S. PATENT DOCUMENTS

| | | | | |
|---|---|---|---|---|
| 6,298,480 B1* | 10/2001 | Beuk | .......................... | G06F 8/61 709/217 |
| 7,437,723 B1* | 10/2008 | Kihara | ...................... | G06F 8/61 717/103 |
| 8,760,686 B2 | 6/2014 | Sato | ............................. | 358/1.15 |
| 2005/0105130 A1* | 5/2005 | Hagiuda | ................. | H04L 67/34 358/1.15 |
| 2007/0183002 A1* | 8/2007 | Corona | .............. | H04N 1/00795 358/474 |
| 2009/0198811 A1* | 8/2009 | Yasui | .................. | H04L 41/0213 709/223 |
| 2010/0171981 A1* | 7/2010 | Koike | ................ | H04N 1/32122 358/1.15 |

FOREIGN PATENT DOCUMENTS

| | | |
|---|---|---|
| JP | 2001-510597 A | 7/2001 |
| WO | WO 97/19395 A2 | 5/1997 |

* cited by examiner

*Primary Examiner* — Mohammad Ghayour
*Assistant Examiner* — Pawandeep Dhingra
(74) *Attorney, Agent, or Firm* — Fitzpatrick, Cella, Harper & Scinto

(57) ABSTRACT

Individual setting values are previously associated with an image forming apparatus to be removed and information regarding the association is stored on a medium. When the medium is connected to the image forming apparatus to be removed and an automatic installation program is executed, the association is removed. Subsequently, when the medium is connected to an image forming apparatus to be installed and the automatic installation program is executed, individual setting values that are not associated with an image forming apparatus to be removed are identified and imported.

12 Claims, 30 Drawing Sheets

INDIVIDUAL DATA MANAGEMENT TABLE ⟵ 670

| 671 | 672 | 673 | 674 | 675 | 676 |
|---|---|---|---|---|---|
| INDIVIDUAL DATA ID | CASE ID | INDIVIDUAL DATA NAME | DEVICE ID OF MFP TO BE INSTALLED | DEVICE ID OF MFP TO BE REMOVED | INDIVIDUAL DATA |
| X001 | M001 | NAME d1 | — | L001 | ... |
| X002 | M001 | NAME d2 | — | L002 | ... |
| X003 | M001 | NAME d3 | — | L003 | ... |
| X004 | M002 | NAME d4 | N009 | — | ... |

FIG. 6A

CASE OVERVIEW MANAGEMENT TABLE ~600

| CASE ID | CASE NAME | INSTALLATION STATUS | COMMENT |
|---------|-----------|---------------------|---------|
| M001 | NAME m1 | NOT COMPLETE | ... |
| M002 | NAME m2 | COMPLETE | ... |
| M003 | NAME m3 | COMPLETE | ... |

FIG. 6B

MFP MANAGEMENT TABLE ~620

| DEVICE ID OF MFP TO BE INSTALLED | CASE ID |
|----------------------------------|---------|
| N001 | M001 |
| N002 | M001 |
| N003 | M001 |
| N009 | M002 |

FIG. 6C

COMMON DATA MANAGEMENT TABLE ~650

| COMMON DATA ID | CASE ID | COMMON DATA |
|----------------|---------|-------------|
| C001 | M001 | ... |
| C002 | M002 | ... |
| C003 | M003 | ... |

F I G. 6D

INDIVIDUAL DATA MANAGEMENT TABLE ~670

| INDIVIDUAL DATA ID 671 | CASE ID 672 | INDIVIDUAL DATA NAME 673 | DEVICE ID OF MFP TO BE INSTALLED 674 | DEVICE ID OF MFP TO BE REMOVED 675 | INDIVIDUAL DATA 676 |
|---|---|---|---|---|---|
| X001 | M001 | NAME d1 | — | L001 | ... |
| X002 | M001 | NAME d2 | — | L002 | ... |
| X003 | M001 | NAME d3 | — | L003 | ... |
| X004 | M002 | NAME d4 | N009 | — | ... |

FIG. 8A

```
CASE MANAGEMENT PROGRAM                [x]  ~800
CASE DATA LIST              801
┌─────────┬──────────┬─────────┐
│ CASE ID │ CASE NAME│ COMMENT │
├─────────┼──────────┼─────────┤
│ M001    │ NAME d1  │ ...     │
│ M002    │ NAME d2  │ ...     │
│ M003    │ NAME d3  │ ...     │
└─────────┴──────────┴─────────┘
[GENERATE NEW CASE] [EDIT] [WRITE TO USB]  ~804
       802           803    [ END ]        ~805
```

FIG. 8B

```
CASE MANAGEMENT PROGRAM                     ~850
CASE ID : M001    851      852       853
          [CASE DATA OVERVIEW][COMMON DATA][INDIVIDUAL DATA
              SETTINGS       ][ SETTINGS  ][  SETTINGS    ]

INDIVIDUAL DATA NAME :         [            ]   ~854
DEVICE ID OF MFP TO BE INSTALLED : [      ▼]   ~855
DEVICE ID OF MFP TO BE REMOVED :   [        ]   ~856
DETAILED SETTINGS OF INDIVIDUAL DATA : [DETAILED SETTINGS] ~857
                              [ADD INDIVIDUAL DATA TO LIST] ~858

LIST OF INDIVIDUAL DATA ALREADY ADDED
┌────────────┬────────────┬──────────┬──────────┐
│ INDIVIDUAL │ INDIVIDUAL │ MFP TO BE│ MFP TO BE│  ~859
│ DATA ID    │ DATA NAME  │ INSTALLED│ REMOVED  │
├────────────┼────────────┼──────────┼──────────┤
│ X001       │ NAME d1    │   -      │ L001     │
│ X002       │ NAME d2    │   -      │ L002     │
│ X003       │ NAME d3    │   -      │ L003     │
└────────────┴────────────┴──────────┴──────────┘
[ADD INDIVIDUAL DATA] [DELETE INDIVIDUAL DATA]  ~861
    FROM FILE              FROM LIST
      860          862~[SAVE] [CANCEL]  ~863
```

FIG. 12

```xml
<?xml version="1.0" encoding="utf-8" ?>
<IScript xmlns:xsi="http://www.XXX.com/XMLSchema">
    <setupId>
        <id>M001</id>
    </setupId>                                              ~1201

<deviceId>
        <id>N001</id>
    </deviceId>                                             ~1202

<!-- Installation Script Commands -->
    <commands>
        <!-- FIRMWARE UPDATING PROCESS -->
        <updateFirmwareCommand order="1">
            <dirPath>Firmware</dirPath>
            <firmwareName>Firmware.zip</firmwareName>
        </updateFirmwareCommand>                            ~1203

<!--EXTENSION PROGRAM INSTALLATION PROCESS -->
        <installApplicationCommand order="2">
            <dirPath>App</dirPath>
            <appName>Application.jar</appName>
            <licenseDirPath>App</licenseDirPath>
            <licenseFileName>App-License.lic</licenseFileName>
        </installApplicationCommand>                        ~1204

<!-- EXTENSION PROGRAM START PROCESS -->
        <startApplicationCommand order="3">
            <appId>13579246-e1b2-6413-adee-00e0032fab94c</appId>
        </startApplicationCommand>                          ~1205

<!-- OPTION ACTIVATE PROCESS -->
        <activateOptionCommand order="4">
            <dirPath>Option</dirPath>
            <licenseFileName>Option-License.lic</licenseFileName>
        </activateOptinoCommand>                            ~1206

<!-- DEVICE SETTINGS INFORMATION IMPORT PROCESS -->
        <importDeviceConigCommand order="5">
            <dirPath>DevConfig</dirPath>
            <comFileName>deviceConfigurationFile.zip</comFileName>
            <exFileName>unknown</exFileName>
        </importDeviceConigCommand>                         ~1207

<!--APPLICATION SETTINGS INFORMATION IMPORT PROCESS -->
        <importAppConigCommand order="6">
            <dirPath>AppConfig</dirPath>
            <fileName>applicationConfigFile001.zip</fFileName>
        </importAppConigCommand>                            ~1208

<!-- REBOOT PROCESS -->
        <rebootCommand order="7">
        </rebootCommand >                                   ~1209

</commands>
</IScript>
```

1200, 1210

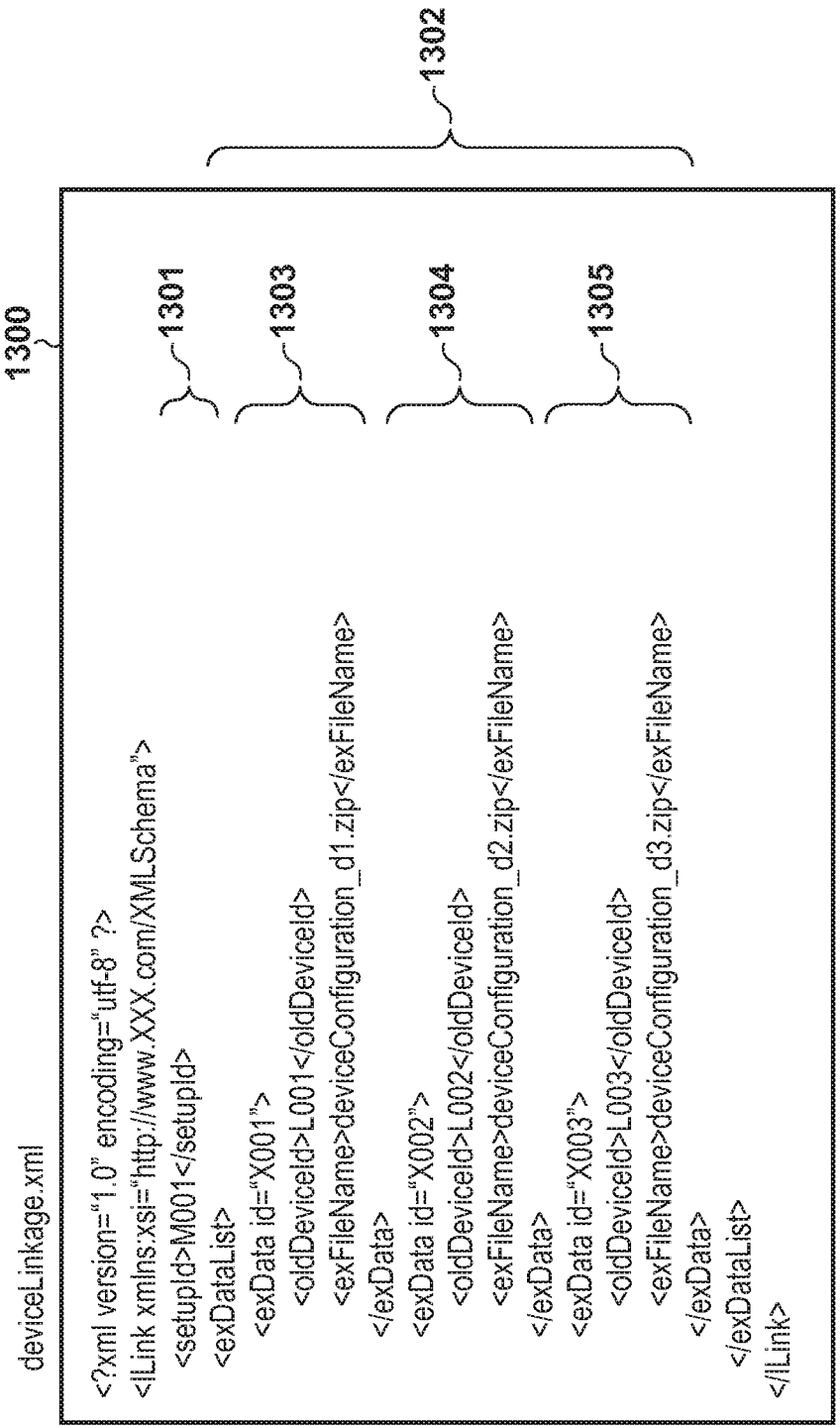

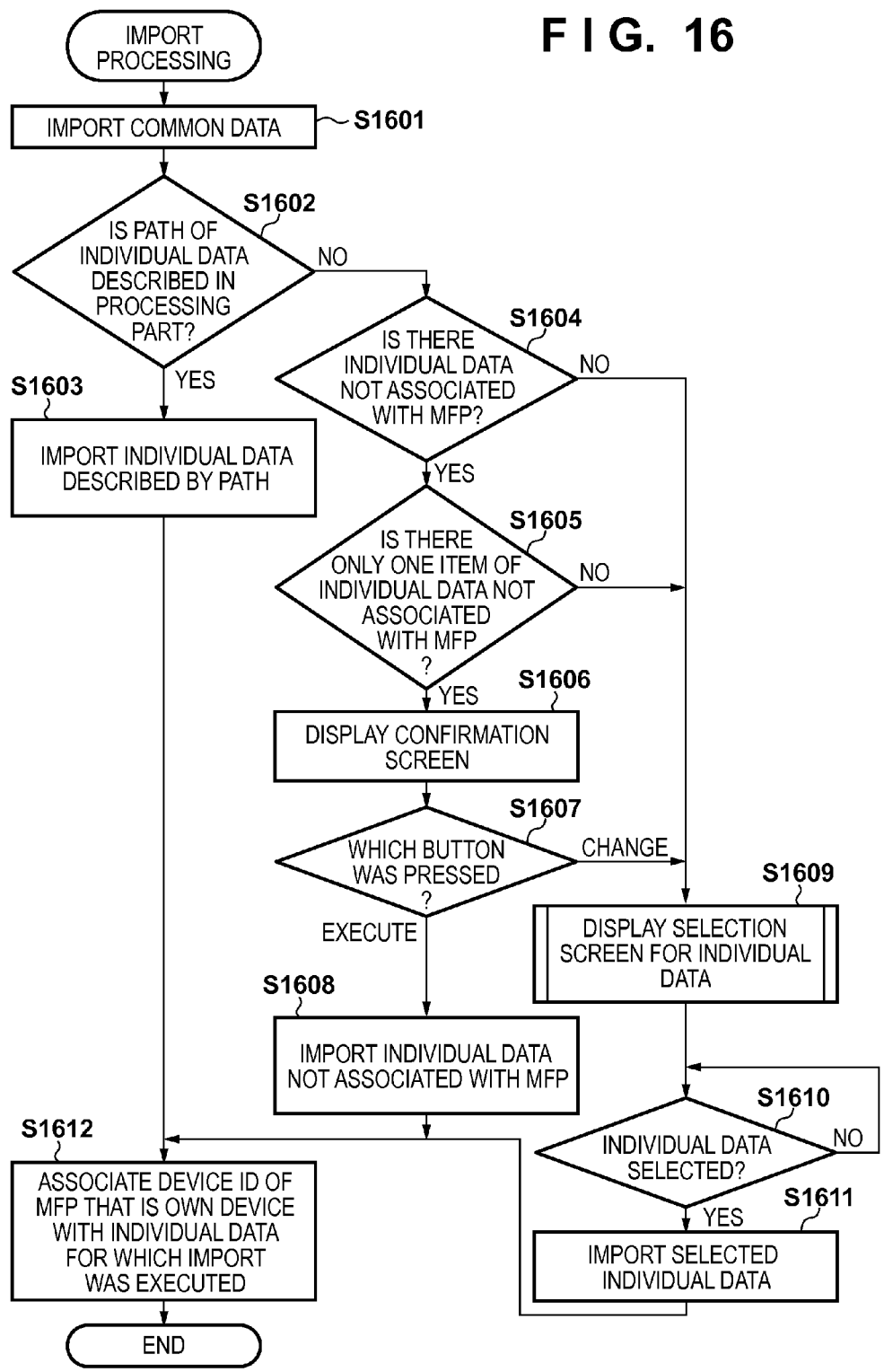

FIG. 18A deviceLinkage.xml                                                      1800

```xml
<?xml version="1.0"encoding="utf-8" ?>
<ILink xmlns:xsi="http://www.XXX.com/XMLSchema">
  <matterId>M001</matterId>
  <exDataList>
    <exData id="X001">
      <newDeviceId>N001</newDeviceId>
      <exFileName>deviceConfiguration_d1.zip</exFileName>
    </exData>
    <exData id="X002">
      <newDeviceId>N002</newDeviceId>
      <exFileName>deviceConfiguration_d2.zip</exFileName>
    </exData>
    <exData id="X003">
      <newDeviceId>N003</newDeviceId>
      <exFileName>deviceConfiguration_d3.zip</exFileName>
    </exData>
  </exDataList>
</ILink>
```

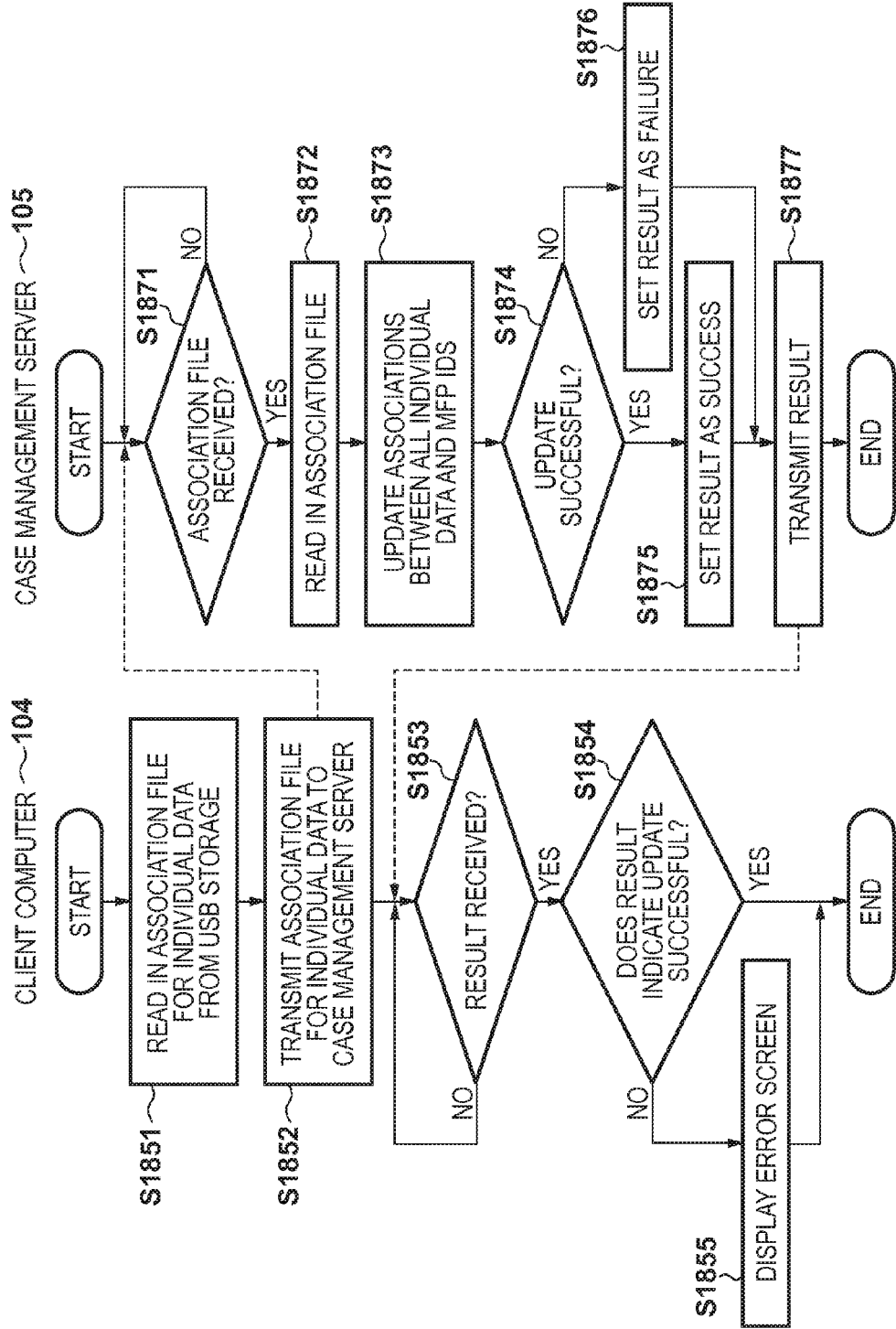

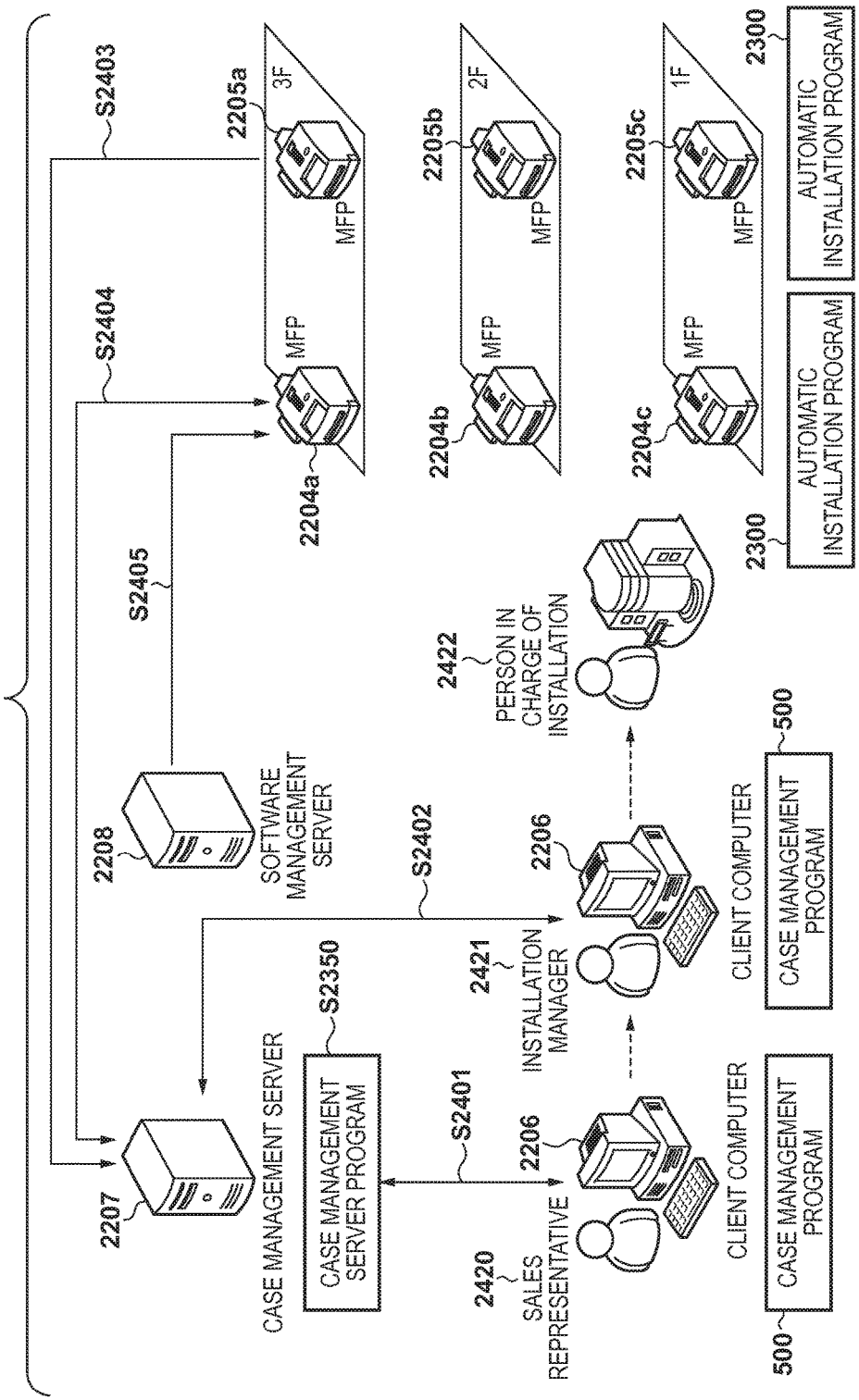

IMAGE FORMING APPARATUS, AUTOMATIC INSTALLATION METHOD FOR EFFICIENTLY INSTALLING AN IMAGE FORMING APPARATUS, AND STORAGE MEDIUM

BACKGROUND OF THE INVENTION

Field of the Invention

The present invention relates to an image forming apparatus and an information processing apparatus, an automatic installation system and an automatic installation method for efficiently installing a plurality of image forming apparatuses.

Description of the Related Art

When newly installing an image forming apparatus such as an MFP (multifunction peripheral) or an SFP (single-function printer), it is necessary to perform installation operations according to the usage environment at the customer's premises. Operations to install an image forming apparatus require a large amount of time and labor. Therefore, in a case where similar installation operations can be performed for a plurality of image forming apparatuses, the software as well as the setting values and verification data and the like that are required as the usage environment are prepared in advance. Further, systems have been proposed for automatically and efficiently performing such installation operations by processing the aforementioned items in accordance with installation instruction information. Furthermore, when performing individual settings for each of a plurality of image forming apparatuses, a correspondence list between target identifiers that can specify the image forming apparatuses that are the targets and the individual data is managed in a host system. A system has also been proposed that implements individual installation operations in accordance with the aforementioned correspondence list (see International Publication No. WO97/19395).

However, in some cases setting values that must be set individually with respect to respective image forming apparatuses are determined depending on the place or department in which the image forming apparatuses are to be positioned. For example, in some cases the positioning place or the device name will differ depending on the floor or department in which the respective image forming apparatuses are to be positioned, and address books to be registered and the like will also differ. When positioning a plurality of image forming apparatuses of the same model at a customer's premises, normally arbitrary image forming apparatuses among the image forming apparatuses that are delivered are merely positioned at designated places, and it is not the case that the positioning places and image forming apparatuses are matched beforehand. That is, since individual data that is determined according to the positioning place and the like and target identifiers of the image forming apparatuses cannot be associated in advance, the system proposed in International Publication No. WO97/19395 cannot be adapted to such kinds of cases.

SUMMARY OF THE INVENTION

The present invention has been made in consideration of the above described conventional technology, and provides an image forming apparatus and an information processing apparatus, an automatic installation system and an automatic installation method that, when replacing devices, even in a case where the respective installation locations for the devices are first determined when installing the devices, can automatically perform settings that are suitable for the image forming apparatuses at the respective installation locations.

According to one aspect, the present invention has the following configuration.

An image forming apparatus, comprises: a connecting unit for, with respect to one or a plurality of image forming apparatuses to be installed, accessing a storage unit that stores association information in which setting information that is to be individually imported into each of the image forming apparatuses to be installed and an identifier of an image forming apparatus to be removed that is to be replaced by the image forming apparatus to be installed are associated; a selection unit for selecting removal or installation of the image forming apparatus; and a processing unit that, in a case where removal of an image forming apparatus is selected by means of the selection unit, removes an association between an identifier of the image forming apparatus and the setting information from the association information that is stored in the storage unit, and in a case where installation of an image forming apparatus is selected, imports setting information which is not associated with an identifier of an image forming apparatus among the association information that is stored in the storage unit.

Further, according to another aspect, the present invention has the following configuration.

An information processing apparatus, comprises: an input unit that accepts input of an identifier of an image forming apparatus to be installed, an identifier of an image forming apparatus to be removed, and setting information including individual setting information to be imported into the image forming apparatus to be installed; and a generation unit that, with respect to the image forming apparatus to be installed, generates association information in which the individual setting information and the identifier of the image forming apparatus to be removed are associated, and stores the association information and the setting information in a storage unit.

According to still another aspect of the present invention there is provided an automatic installation system for an image forming apparatus, comprising: an information processing apparatus comprising a generation unit that, with respect to one or a plurality of image forming apparatuses to be installed, generates association information in which setting information that is to be individually imported into each of the image forming apparatuses to be installed and an identifier of an image forming apparatus to be removed that is to be replaced by the image forming apparatus to be installed are associated, and stores the association information in a storage unit; and an image forming apparatus described above.

According to the present invention, even in an installation case in which individual data that is applied depending on the positioning place and a target identifier of an image forming apparatus is determined during operations to install the image forming apparatus, the appropriate installation can be automatically implemented when replacing an image forming apparatus.

Further features of the present invention will become apparent from the following description of exemplary embodiments with reference to the attached drawings.

BRIEF DESCRIPTION OF THE DRAWINGS

FIG. 6A to FIG. 6D are views illustrating the configuration of tables of a case data storage unit of the case management server;

FIG. 8A and FIG. 8B are views illustrating an example of a UI of a case management program;

FIG. 12 is a view illustrating an example of an installation script;

FIG. 13 is an example of an association file for individual data;

FIG. 16 is a flowchart illustrating processing for importing device setting information;

FIG. 18A and FIG. 18B are views illustrating processing after installation is performed;

FIG. 24 is a view illustrating a workflow of installation operations to install MFPs according to Embodiment 3;

DESCRIPTION OF THE EMBODIMENTS

Hereunder, modes for carrying out the present invention will be described using the accompanying drawings.

[Embodiment 1]
<System Configuration>

Figure 1:
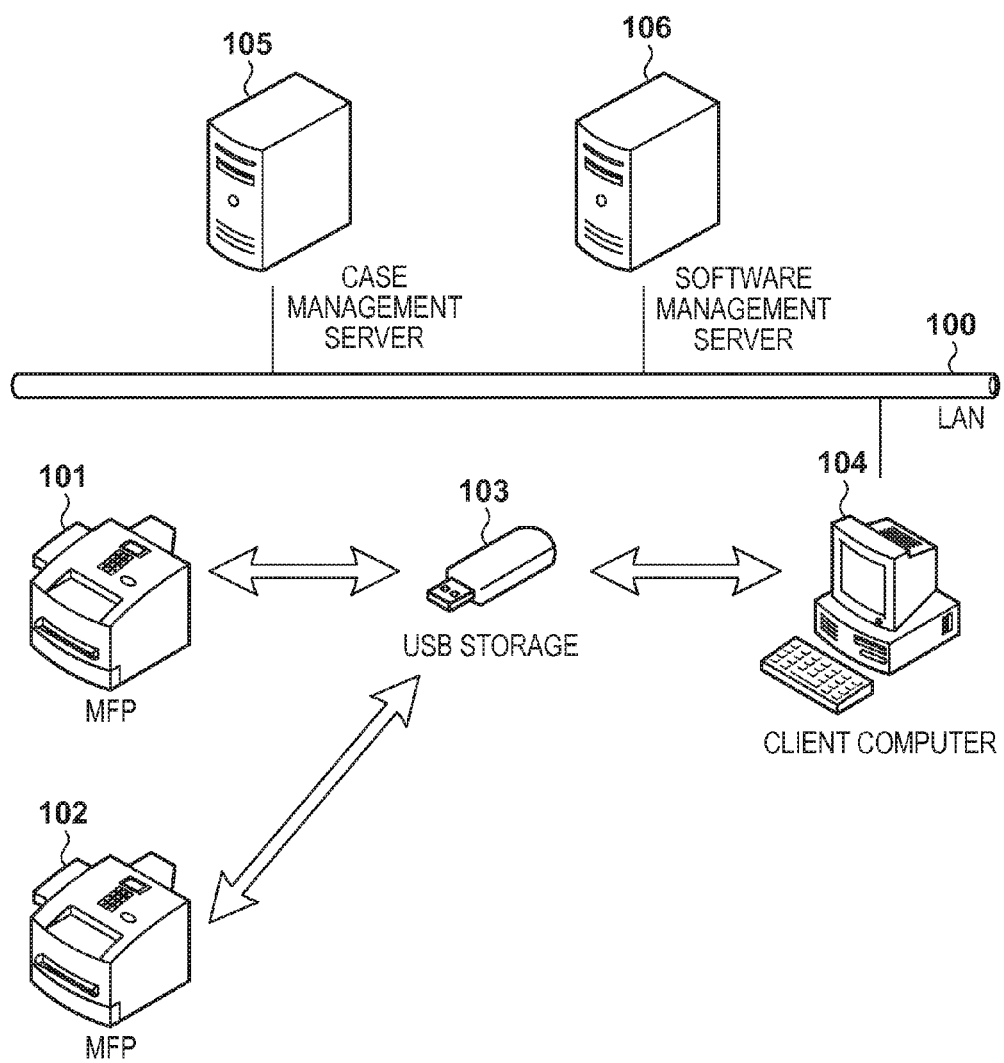
FIG. 1 is a view illustrating an example of the configuration of equipment in an automatic installation system of the present invention.

FIG. 1 is a view illustrating an example of the configuration of equipment in an automatic installation system of the present invention. In the automatic installation system of the present invention, a client computer 104, a case management server 105 and a software management server 106 are connected to a LAN (local area network) 100. A MFP (multifunction peripheral) 101 and a MFP 102 are not connected to the LAN 100. It is possible for the MFP 101 and MFP 102 to exchange data with the client computer 104 or the like via a USB storage 103 that is an example of a portable storage medium. Note that, although in the present embodiment an MFP is mentioned as an example of an image forming apparatus, naturally the image forming apparatus may also be an SFP or the like.

The MFP 101 is an MFP that is to be installed hereafter in a customer's environment. Automatic installation with respect to the MFP 101 will be described in the present embodiment. Note that the MFP 101 has a network interface that is capable of connecting to a network. However, since the present embodiment is an embodiment relating to a process for installing an image forming apparatus under an environment in which a network cannot be utilized, the MFP 101 is illustrated as not being connected to the LAN 100.

The MFP 102 is an MFP to be removed which is already installed in the customer's environment. In the present embodiment, a case is described in which the MFP 102 is replaced with the MFP 101. The replacement is performed by removing the MFP 102 and newly installing the MFP 101. Note that, although it is assumed that the MFP 102 is connected to a LAN in the customer's environment as the MFP 102 is installed in the customer's environment, since the LAN in the customer's environment and the LAN 100 are different, the MFP 102 is illustrated as not being connected to the LAN 100.

The MFP 101 and MFP 102 are image forming apparatuses in which a plurality of functions such as a scanner, a printer, a facsimile and a file transmission function are integrated into a copying machine. The MFP 101 and MFP 102 include an interface that connects with a portable storage medium. The kind of interface that connects with a portable storage medium is not particularly limited, and in the present embodiment a USB interface is used. When the USB storage 103 is connected to the present USB interface, reading and writing of data from and to the USB storage 103 can be performed.

The client computer 104 is an information processing apparatus such as a so-called "personal computer". The client computer 104 has an interface that connects with a portable storage medium. The kind of interface that connects with a portable storage medium is not particularly limited, and in the present embodiment a USB interface is used. When the USB storage 103 is connected to the present USB interface, reading and writing of data from and to the USB storage 103 can be performed.

The case management server 105 is a server that manages case data in which the settings contents of the MFP 101 are registered and which is generated using the client computer 104. The case data will be described later. The case management server 105 may be connected to the LAN 100 directly or may be connected thereto via the Internet.

The software management server 106 is a server that manages firmware that can be utilized at the MFP 101 as well as various kinds of license information and the like. The software management server 106 may be connected to the LAN 100 directly or may be connected thereto via the Internet.

<MFP>

Figure 2A:
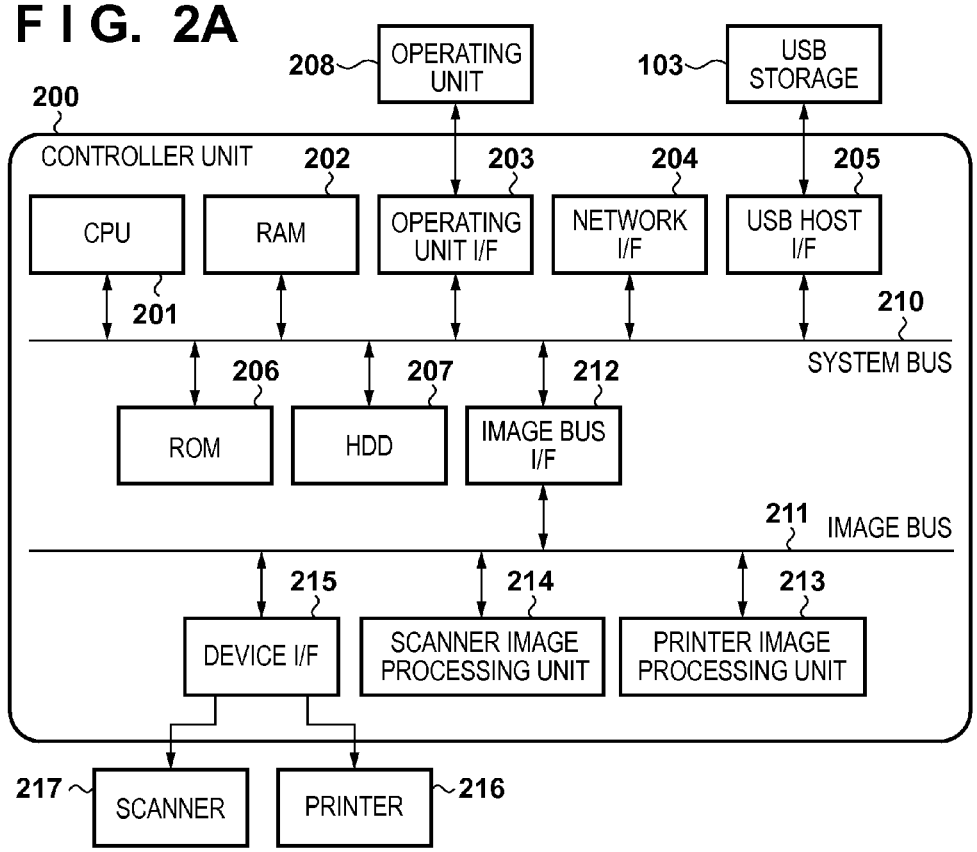
FIG. 2A and FIG. 2B are views illustrating the hardware configuration of an MFP and a client computer.

FIG. 2A is a block diagram illustrating an example of the configuration of principal parts of the MFP 101 and the MFP 102. The MFP 101 and MFP 102 include a controller unit 200. A scanner 217 that is an image input device and a printer 216 that is an image output device are connected to the controller unit 200. An operating unit 208 is also connected to the controller unit 200. The controller unit 200 performs control for realizing a copy function that uses the printer 216 to print out image data that was scanned using the scanner 217.

The controller unit 200 includes a CPU 201 that is a processor. The CPU 201 boots an operating system (OS) by means of a boot program that is stored on a ROM 206. The CPU 201 executes programs that are stored on a HDD (hard disk drive) 207 on the OS, to thereby execute various processing operations. A RAM 202 is used as a work area of the CPU 201. The RAM 202 provides a work area, and also provides an image memory area for temporary storage of image data. The HDD 207 stores the aforementioned programs or image data. The ROM 206 and RAM 202 and an operating unit I/F (operating unit interface) 203 are connected to the CPU 201 through a system bus 210. A network I/F (network interface) 204, a USB host I/F 205 and an image bus I/F (image bus interface) 212 are also connected to the CPU 201.

The operating unit I/F 203 is an interface with the operating unit 208 that has a touch panel, and outputs image data that is to be displayed on the operating unit 208 to the operating unit 208. The operating unit I/F 203 also sends information that was input by a user at the operating unit 208 to the CPU 201. The network I/F 204 is an interface for connecting the MFP 101 and the MFP 102 to a LAN. The USB host I/F 205 is an interface unit that communicates with the USB storage 103. The USB host I/F 205 outputs data stored on the HDD 207 to the USB storage 103. The USB host I/F 205 also inputs data that is stored on the USB storage 103, and sends the data to the CPU 201. The USB storage 103 is an external memory device that stores data, and is detachably attachable to the USB host I/F 205. A plurality of USB devices including the USB storage 103 can be connected to the USB host I/F 205. The image bus I/F 212 is a bus bridge for connecting the system bus 210 and an image bus 211 that transfers image data at high speed, and for converting a data format. The image bus 211 is constituted by a PCI bus, an IEEE 1394 or the like. A device I/F 215, a scanner image processing unit 214 and a printer image processing unit 213 are provided on the image bus 211. The scanner 217 and the printer 216 are connected to the device I/F 215. The device I/F 215 performs synchronous/asynchronous conversion of image data. The scanner image processing unit 214 performs correction, processing and editing with respect to input image data. The printer image processing unit 213 subjects print output image data to correction and resolution conversion or the like in accordance with the printer 216.

<Client Computer>

Figure 2B:
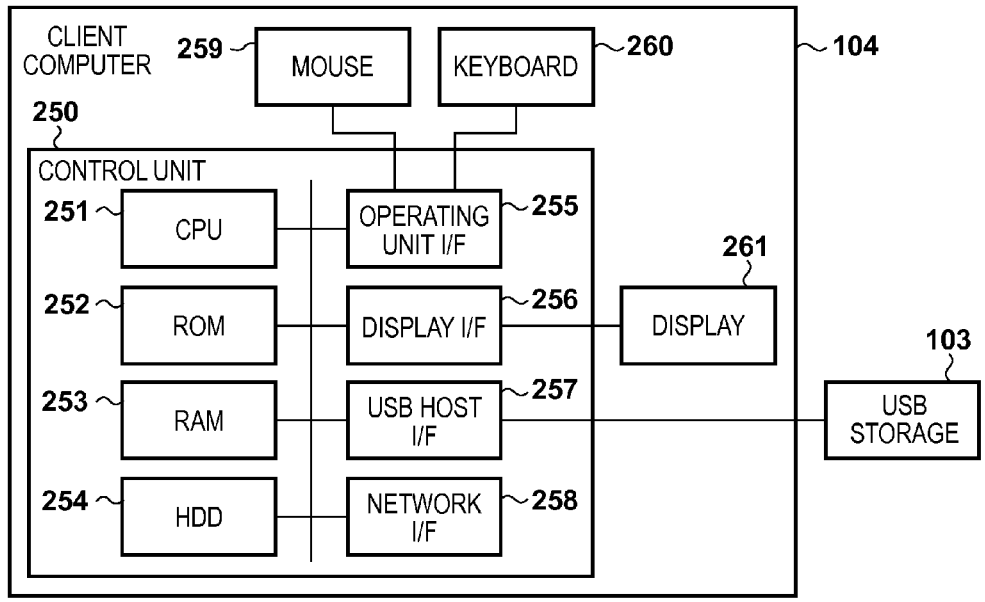

FIG. 2B is a block diagram illustrating the configuration of the client computer 104. A control unit 250 that includes a CPU 251 controls the overall operations of the client computer 104. The CPU 251 reads out a control program that is stored on a ROM 252 and executes various kinds of control processing. A RAM 253 is used as a temporary storage area such as a work area or a main memory of the CPU 251. A HDD 254 stores image data or various kinds of programs. An operating unit I/F 255 is an interface that connects a user interface terminal that inputs control operations for a program that is executed at the client computer 104. Although in the present embodiment the operating unit I/F is constituted by a mouse 259 or a keyboard 260, the operating unit I/F is not limited thereto. A display I/F 256 is an interface that connects a display terminal that displays a UI of a program that is executed at the client computer 104. Although in the present embodiment the display I/F is constituted by a display 261, the display I/F is not limited thereto. A network I/F 258 connects the control unit 250 to the LAN 100. The network I/F 258 sends and receives various kinds of information to and from other apparatuses through a network. A USB host I/F 257 is an interface unit that communicates with the USB storage 103. The USB host I/F 257 outputs data stored on the HDD 254 to the USB storage 103. The USB host I/F 257 also inputs data that is stored on the USB storage 103, and sends the data to the CPU 251. The USB storage 103 is an external memory device that stores data, and is detachably attachable to the USB host I/F 257. A plurality of USB devices including the USB storage 103 can be connected to the USB host I/F 257.

<Server>

Figure 3A:
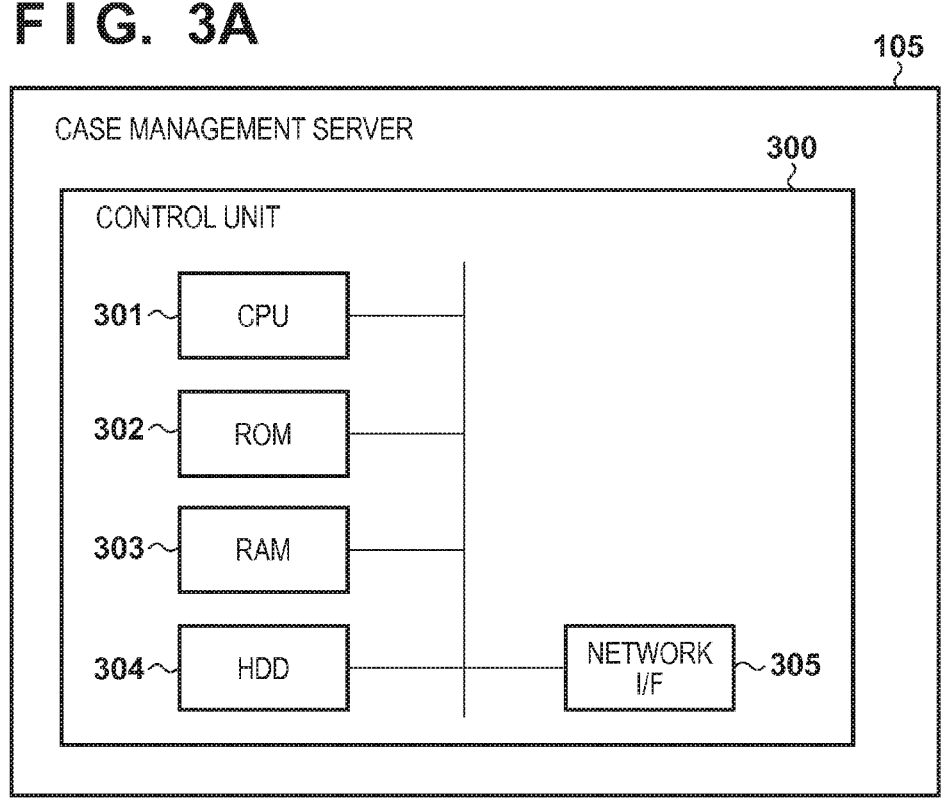
FIG. 3A and FIG. 3B are views illustrating the hardware configuration of respective servers.

FIG. 3A is a block diagram illustrating the configuration of the case management server 105. A control unit 300 that includes a CPU 301 controls the overall operations of the case management server 105. The CPU 301 reads out a control program that is stored on a ROM 302 and executes various kinds of control processing. A RAM 303 is used as a temporary storage area such as a work area or a main memory of the CPU 301. A HDD 304 stores image data and various kinds of programs, or various kinds of information tables that are described later. A network I/F 305 connects the control unit 300 to the LAN 100. The network I/F 305 sends and receives various kinds of information to and from other apparatuses through a network.

Figure 3B:
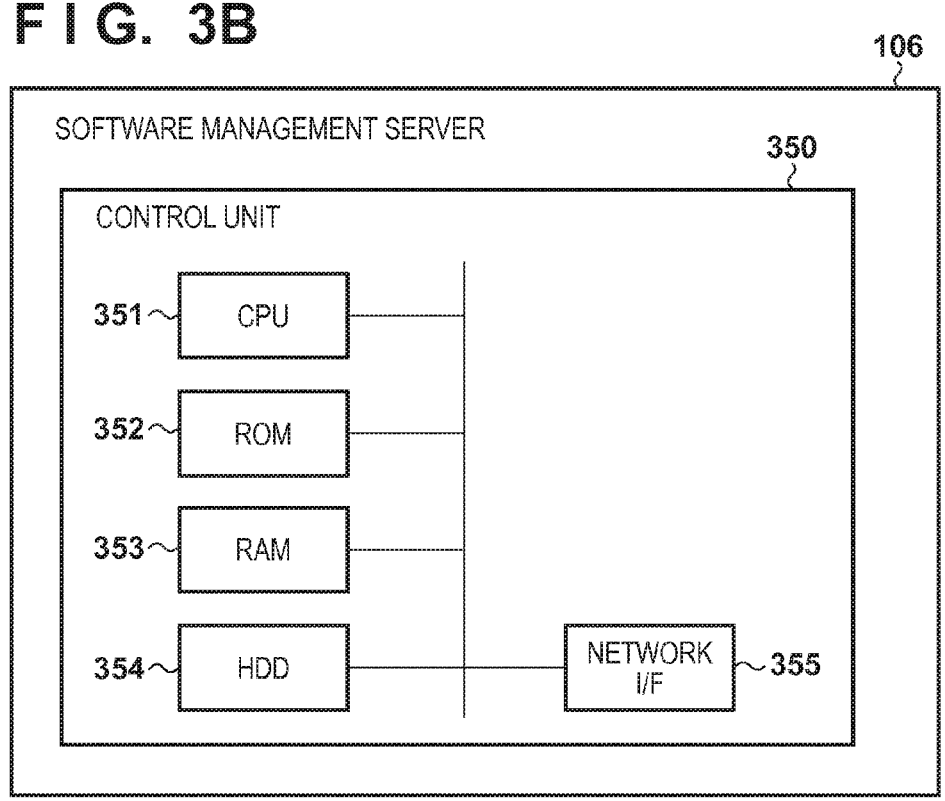

FIG. 3B is a block diagram illustrating the configuration of the software management server 106. The software management server has the same configuration as the case management server 104, and hence a description thereof is omitted.

<Example of Software Configuration of MFP>

Figures 4A, 4B:
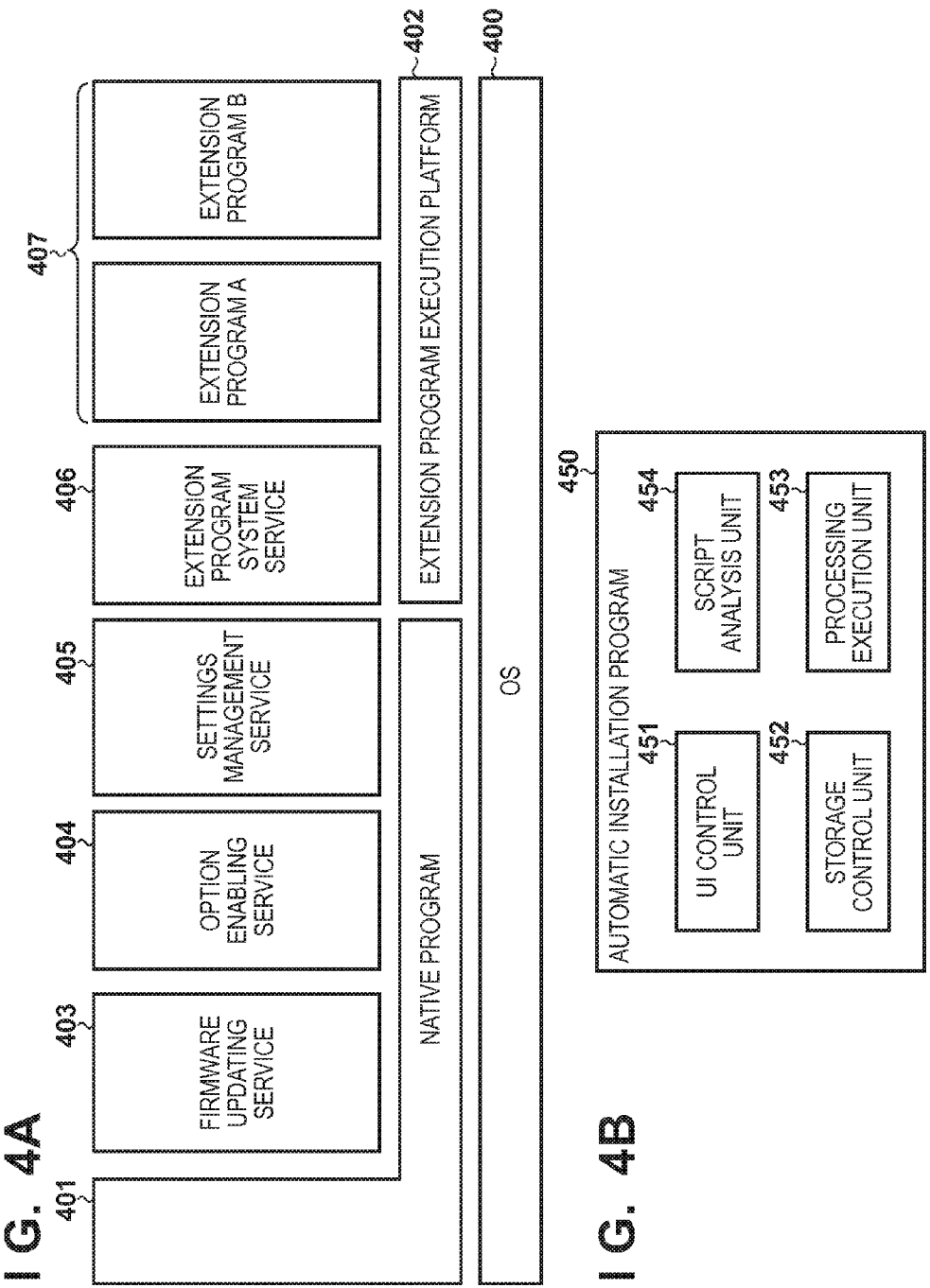
FIG. 4A and FIG. 4B are views illustrating the software configuration of an MFP.

FIG. 4A is a view illustrating an example of the software configuration of the MFP 101 and the MFP 102. A native program 401 that is a control program that is originally provided in the printer and FAX or scanner or the like, and an extension program execution platform 402 that is an extension program execution platform operate on the OS 400. In addition, a firmware updating service 403, an option enabling service 404 and a settings management service 405 operate on the native program 401. Further, an extension program system service 406 and an extension program 407 operate on the extension program execution platform 402.

The firmware updating service 403 is a service that provides various functions for updating firmware. For example, the firmware updating service 403 refers to firmware designated by a user and determines whether or not updating of the firmware is required. The firmware updating service 403 also updates firmware for the native program 401 or through the native program 401.

The option enabling service 404 is a service for enabling optional functions that are previously incorporated into the native program 401. The option enabling service 404 identifies and enables an option function that is specified by an option license file that is designated by the user.

The settings management service 405 is a service for managing various types of setting information of the printer or scanner or the like. When, for example, a user designates one or a plurality of settings or a file that includes a plurality of items of setting information, the settings management service 405 provides a function that rewrites settings information of the native program 401. Note that, the settings management service 405 has a user interface (hereunder, referred to as "UI"), and a user can input instructions to change settings through the operating unit 208 of the MFP 101 and MFP 102. In addition, the settings management service 405 provides settings information in a file format in response to a request from an extension program that is sent through the extension program system service 406. Hereunder, this function is referred to as "export of a device settings information file".

The extension program system service 406 is a useful utility library that is shared by the extension programs, and is provided from the system. Troublesome operations in relation to the development of an extension program can be omitted by calling the function of the extension program system service 406 from the extension program 407. The extension program 407 can access each module of the MFP 101 and the MFP 102, such as the other extension program 407 or the RAM 202 only through the extension program execution platform 402 or the extension program system service 406. Further, the extension program 407 includes a UI and can display an icon on a main menu screen that is displayed on the operating unit 208 of the MFPs 101 and 102. When the operating unit I/F 203 detects that the user selected the icon through the operating unit 208, the operating unit I/F 203 sends a notification to that effect to the CPU 201. Upon receiving the notification, the CPU 201 displays the UI of the extension program selected by the user on the operating unit 208.

Note that the present description of the software configuration describes only basic features thereof, and other services may also be included depending on the execution environment. Furthermore, services that are unnecessary due to a reason such limitation of the settings may be omitted.

<Functional Configuration of Automatic Installation Program>

FIG. 4B is a view illustrating an example of the functional configuration of an automatic installation program 450 that operates on the MFP 101 and MFP 102. In the present embodiment it is assumed that the automatic installation program 450 is implemented as one of the extension programs 407 of the MFP 101 and MFP 102. The respective functions are realized by the CPU 201 executing programs corresponding to the respective functions.

The automatic installation program 450 includes a UI control unit 451, a storage control unit 452, a processing execution unit 453 and a script analysis unit 454. The UI control unit 451 provides a UI for operating the automatic installation program 450 to the user through the operating unit 208, and accepts user operations. The storage control unit 452 accesses the USB storage 103 and performs reading and writing of data from and to the USB storage 103. The storage control unit 452 also detects insertion and withdrawal of the USB storage 103. The processing execution unit 453 performs various kinds of processing in accordance with instructions of the UI control unit 451 and the storage control unit 452. The script analysis unit 454 analyzes an installation script that is installation operations instruction information that is stored on the USB storage 103, and decides processing that the processing execution unit 453 should execute as well as the order of the processing.

<Functional Configuration of Case Management Program>

Figure 5A:
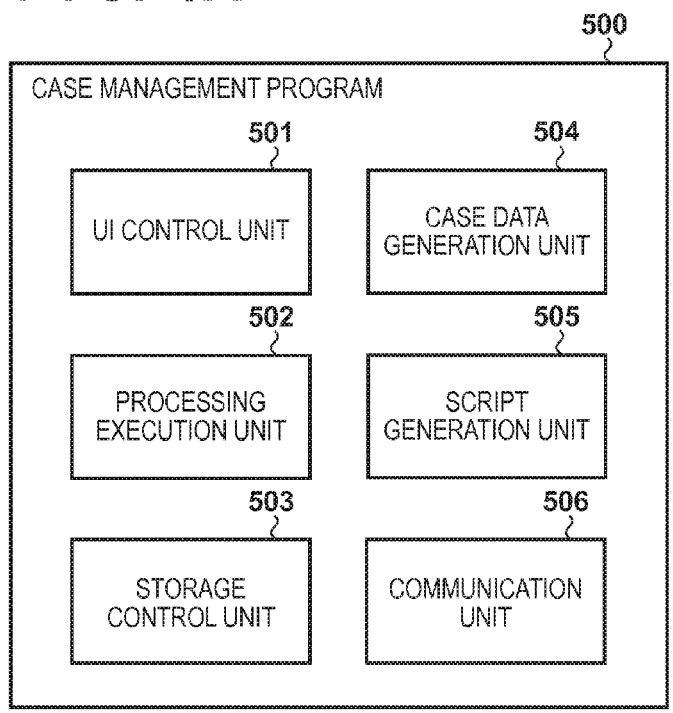
FIG. 5A and FIG. 5B are views illustrating the software configuration of a client computer and a case management server.

FIG. 5A is a view illustrating an example of the functional configuration of a case management program 500 that operates on the client computer 104. The respective functions are realized by the CPU 201 by executing a program. Although in the present embodiment it is assumed that the programs are executed by the client computer 104, the present invention is not limited thereto. The programs may also be executed by a server or a service on a network via the network I/F 258.

The case management program 500 has a UI control unit 501, a processing execution unit 502, a storage control unit 503, a case data management unit 504, a script generation unit 505 and a communication unit 506. The UI control unit 501 provides a UI for operating the case management program 500 to an operator through the display 261, and accepts an operation by the operator through the mouse 259 or keyboard 260. The processing execution unit 502 performs various kinds of processing in accordance with instructions of the UI control unit 501 and the storage control unit 503. The storage control unit 503 performs reading and writing of data from and to the USB storage 103. The storage control unit 503 also detects insertion and withdrawal of the USB storage 103. The case data generation unit 504 generates case data in accordance with instructions of the processing execution unit 502, based on information that is input from the UI control unit 501. In accordance with an instruction of the processing execution unit 502, the script generation unit 505 generates installation scripts that the automatic installation program 450 is capable of analyzing, based on case data that was generated by the case data management unit 504. In accordance with an instruction of the processing execution unit 502, the communication unit 506 transmits case data to the case management server 105 or acquires case data that is held by the case management server 105. Further, in accordance with an instruction of the processing execution unit 502, the communication unit 506 acquires various kinds of software such as firmware or a license file from the software management server 106.

<Functional Configuration of Case Management Server Program>

Figure 5B:
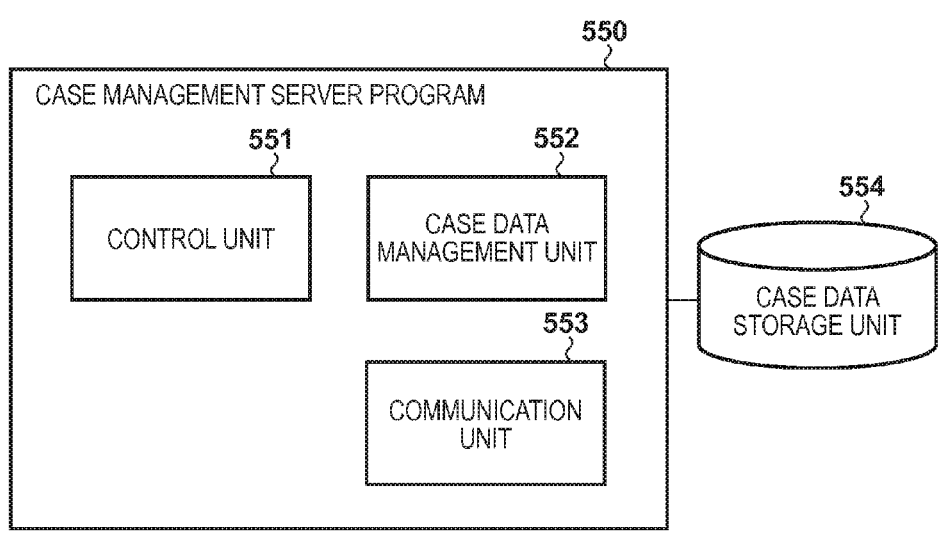

FIG. 5B is a view illustrating an example of the functional configuration of a case management server program 550 and a case data storage unit 554 that operate on the case management server 105. The respective functions are realized by the CPU 301 by executing a program.

The case management server program 550 is a Web application having a control unit 551, a case data management unit 552 and a communication unit 553. In accordance with the contents of a request that the communication unit 553 receives, the control unit 551 instructs the case data management unit 552 to perform processing such as storing, deleting, updating or acquiring case data. In accordance with an instruction from the control unit 551, the case data management unit 552 stores, deletes or updates case data in the case data storage unit 554. The case data management unit 552 also carries out acquisition and the like of case data from the case data storage unit 554. The communication unit 553 receives a request from the client computer 104 or the like, and sends the contents of the request to the control unit 551. In addition, the communication unit 553 receives the results of processing with respect to the request from the control unit 551, creates response data with respect to the request, and transmits a response to the client computer 104 or the like.

The case data storage unit 554 is a database that operates on the case management server 105. The respective functions are realized by the CPU 301 executing a program. Note that, although in the present example the case data storage unit 554 is provided in the case management server 105, a configuration may also be adopted in which the case data storage unit 554 is located at a different server as long as the case data storage unit 554 can operate in conjunction with the case management server program 550. The contents of data that the case data storage unit 554 manages will now be described using FIG. 6A to FIG. 6D.

<Table Group Managed by Case Data Storage Unit>

FIG. 6A to FIG. 6D are examples of tables that the case data storage unit 554 manages. These tables represent case data. Note that the configuration of the tables illustrated in FIG. 6A to FIG. 6D is one example, and the configuration of the tables may be different to the present examples.

FIG. 6A shows a case overview management table 600. The case overview management table 600 is a table that stores an overview of respective cases, and is constituted by a column 601 to a column 604. One record represents one case. The column 601 shows cases IDs. A case ID is an identifier for uniquely identifying case data. The column 602 shows the names of case data. The column 603 shows an installation status. The installation status shows whether installation of all MFPs relating to the relevant case is completed. For example, the installation status for the first record shown in FIG. 6A is "not complete", and it is thus known that installation of MFPs relating to the case that is identified by a case ID "M001" is not completed. The column 604 shows comments. A comment is a supplementary explanation relating to the contents of a case.

FIG. 6B shows an MFP management table 620. The MFP management table 620 is a table that stores information relating to MFPs to be installed, and is constituted by a column 621 and a column 622. One record represents one MFP to be installed. The column 621 shows a device ID of an MFP to be installed. The device ID is an identifier for uniquely identifying an MFP. The column 622 shows a case ID. An MFP to be installed and a case are associated by the column 621 and the column 622. For example, it is known that installation of an MFP for which the device ID is "N001", which is the first record, is performed in a case for which the case ID is "M001".

FIG. 6C shows a common data management table 650. The common data management table 650 is a table that manages data that is commonly set for each case with respect to MFPs to be installed, and is constituted by a column 651 to a column 653. The column 651 shows a common data ID. The common data ID is an identifier for uniquely identifying common data. The column 652 shows a case ID. The column 653 shows common data. Note that, although in the present example the substance of the common data is stored in the column 653, a configuration may also be adopted in which only a path to the substance of the common data is stored in the column 653, and the substance of the common data is placed as a file in a separate place. Common data and a case are associated by the column 651 and the column 652. For example, it is known that common data for which the common data ID is "C001", which is the initial record, is used in the case for which the case ID is "M001".

FIG. 6D shows an individual data management table 670. The individual data management table 670 is a table that manages data that is set for each MFP to be installed, and is constituted by a column 671 to a column 676. The column 671 shows an individual data ID. The individual data ID is an identifier for uniquely identifying an individual data item. A column 672 shows a case ID. A column 673 shows a name of the individual data. A column 674 shows a device ID of a device to be installed. If a device ID of a device to be installed is stored in the column 674, although a positioning place of the relevant MFP to be installed can thus be known, as described in the foregoing there are few cases in which the positioning place is known in advance. When the positioning place is not known in advance, the space for a value in the column 674 is left empty.

A column 675 shows the device ID of an MFP to be removed. In the case of replacing an MFP, the MFP to be removed is already installed in the customer's environment, and the positioning place of the MFP can be identified by discussion with the customer. Therefore, it is possible to associate the device ID of the MFP to be removed and individual data for which setting is desired for the MFP that is to be newly installed at the positioning place at which the MFP to be removed is located. While a method for associating individual data and the MFP to be removed will be described later using FIG. 8A and FIG. 8B, in the individual data management table 670 the relevant association is represented by the column 671 and the column 675. That is, by associating the device ID of the MFP to be removed and the individual data, the installation location and the individual data are also associated.

The column 676 shows individual data. Note that, although in the present example the substance of the individual data is stored in the column 676, a configuration may also be adopted in which only a path to the substance of the individual data is stored in the column 676, and the substance of the individual data is placed as a file in a separate location.

The individual data, case and device ID of the MFP to be removed are associated by the column 671, the column 672 and the column 675. For example, regarding the first record shown in FIG. 6D, it is known that the individual data for which the individual data ID is "X001" is data to be set in an MFP that is to replace an MFP to be removed for which the device ID is "L001" with respect to a case for which the case ID is "M001".

<MFP Replacement Operations Procedure>

Figure 7A:
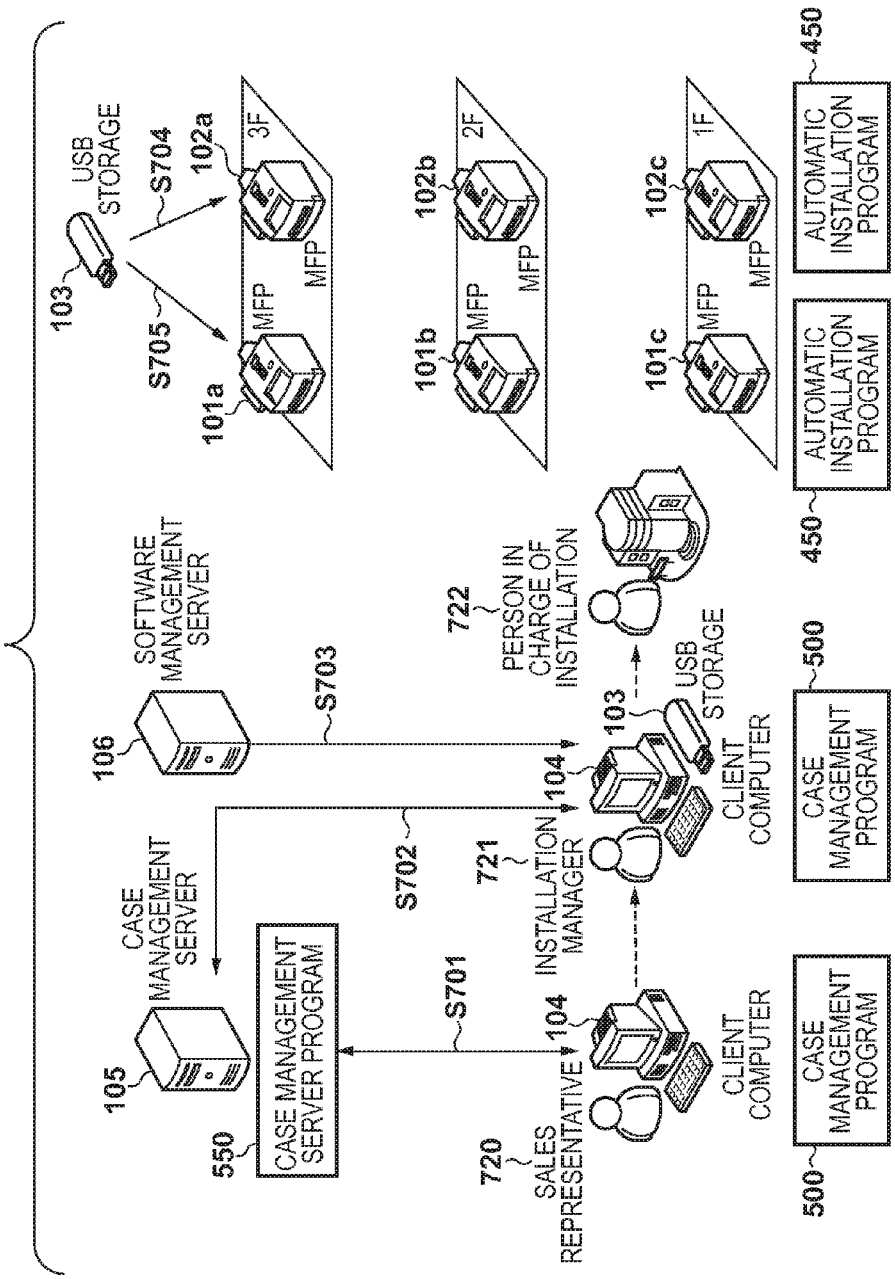
FIG. 7A and FIG. 7B are views illustrating a workflow of installation operations to install MFPs.

FIG. 7A is a workflow diagram that illustrates a workflow until the basic installation of MFPs 101 is performed according to the present invention. In the present example, a case is described of replacing MFPs 102 with MFPs 101. That is, the MFPs 102 are removed and the MFPs 101 are installed. Note that, in FIG. 7A an example is illustrated of a single case in which replacement of three MFPs is performed. Further, in this example, the respective MFPs 101 replace a corresponding MFP 102 that is illustrated as being on the same floor as the relevant MFP 101. For example, an MFP 101a is installed at a place at which an MFP 102a had been positioned.

Reference character S701 denotes operations that a sales representative 720 performs at each sales office. The sales representative 720 uses the case management program 500 of the client computer 104 to input the configurations of the MFPs that were decided through discussions with the customer, as well as the setting contents of the MFPs. The term "configurations of the MFPs" refers to the models, options to be activated, and extension applications to be installed. Further, in this case the sales representative 720 also inputs device IDs of MFPs to be removed, and transmits the contents as case data to the case management server 105 to be stored in the case data storage unit 554 of the case management server 105.

Reference character S702 denotes operations that an installation manager 721 performs in a warehouse or the like for managing the entry and dispatch of MFPs. Here, device IDs that are identifiers that can identify the respective MFPs can be obtained. Since the device IDs that are obtained here are device IDs of MFPs which will be installed hereafter, the device IDs are device IDs of devices to be installed in the present example. Further, in S702 the installation manager determines which place to deliver the respective MFPs to. Therefore, it is also determined which MFPs are to be installed for which cases. Note that, the matter which the installation manager determines in S702 is the delivery location for machines to be installed in the case of interest, and as mentioned above, in many cases positioning places for the individual machines, such as which places on which floors the respective machines will be installed, are not determined. In S702, the installation manager 721 uses the case management program 500 to acquire case data of the case to be processed from the case management server 105. Further, the installation manager 721 edits the case data using the case management program 500 of the client computer 104. Here, the term "edit" refers to registering device IDs of devices to be installed in the case data. The case data in which the device IDs of devices to be installed were registered is transmitted to the case management server 105 again to be managed by the case management server 105.

In S703, the installation manager 721 uses the case management program 500 to generate a USB storage for installation that is used for installing the MFPs. The installation manager 721 uses the case management program 500 to acquire the case data of the case for which installation is to be performed hereafter from the case management server 105. In accordance with the contents of the case data, the installation manager 721 acquires firmware and extension applications that are required for installation as well as license files for installing the firmware and extension applications and the like from the software management server 106. At this time, with regard to licenses of a type in which one license is used for one MFP, the installation manager 721 acquires respective license files based on the device IDs of the MFPs to be installed that were registered in S702. The case management program 500 generates installation scripts that the automatic installation program 450 is capable of analyzing, based on the case data and the acquired software items, and stores the installation scripts together with the acquired software items in the USB storage 103. Although S702 and S703 are described as separate steps, there is no particular need to separate these steps, and a procedure may also be adopted in which the software items are acquired and stored in the USB storage 103 when registering the device IDs of devices to be installed.

Reference character S704 denotes operations a person in charge of installation 722 performs when removing the MFPs 102 from the customer's premises. The person in charge of installation 722 connects the USB storage 103 generated in S703 to the relevant MFP 102. Once the USB storage 103 is connected, the automatic installation program 500 of the MFP 102 specifies individual data that should be set in the MFP 101 to be newly installed at the place at which the MFP 102 is positioned. The details of this processing are described later using FIG. 14A to FIG. 15B. Thereafter, the person in charge of installation 722 actually removes the MFP 102.

Reference character S705 denotes operations the person in charge of installation 722 performs at the customer's premises when actually installing the MFPs 101. When the MFPs 101 and the USB storage 103 are delivered from the warehouse, the person in charge of installation 722 positions the MFPs 101 at the places requested by the customer. When the person in charge of installation 722 connects the USB storage 103 generated in S703 to the relevant MFP 101, the automatic installation program 450 of the MFP 101 executes installation processing that includes installation of the individual data specified in S704.

The foregoing is a description of the workflow until the basic installation of the MFPs 101 is performed according to the present invention. The detailed processing of the respective programs during the operations until the basic installation is performed that has been described using FIG. 7A will now be described using FIG. 8A to FIG. 17D.

<Case Management Program>

FIG. 8A and FIG. 8B illustrate one example of the UI of the case management program 500 of the client computer 104. The sales representative 720 and the installation manager 721 perform operations on the present UI when carrying out the operations in S701, S702 and S703.

FIG. 8A is an example of a UI that displays a list of case data of the case management program 500. The UI 800 includes a case data list 801 and a button 802 to a button 805. When the case management program 500 is started, the case management program 500 acquires a list of case data from the case management server 105. The case management program 500 thereafter sets the acquired list of case data in the case data list 801 and displays the UI 800.

The case data list 801 is a list that displays information regarding the case data. In the present example the case data list 801 displays the case ID, the case name, and the comment.

The button 802 is a button for newly generating case data. When the button 802 is pressed, a UI 850 for generating case data is displayed. The UI 850 will be described later (see FIG. 8B). Because a situation in which the button 802 is pressed is a situation in which case data is to be newly generated, the UI 850 is displayed in a state in which respective controls such as text boxes are empty.

A button 803 is a button for editing case data. If the button 803 is pressed, the case management program 500 acquires detailed information of the case data that is in a selected state in the case data list 801 from the case data management server 105. The case management program 800 sets the acquired detailed information of the case data in respective controls such as text boxes of the UI 850, and displays the UI 850.

A button 804 is a button for performing an operation to write case data to a USB storage. If the button 804 is pressed, the case management program 500 writes case data that is currently selected in the case data list 801 to a USB storage that is connected to the client computer 104. At such time, the case management program 500 generates installation scripts that the automatic installation program 450 is capable of analyzing. Processing to generate the installation scripts is described later using FIG. 10. The button 805 is a button for terminating the case management program 500.

FIG. 8B illustrates an example of a UI of the case management program 500 for editing case data. The UI 850 includes tab pages 851, 852 and 853, and buttons 862 and 863. On the UI 850, the tab page 853 is displayed in an active state. The tab page 853 includes controls 854 to 861 that are text boxes and buttons or the like. Note that, the UI 850 shows an example at a time of editing case data of a case for which the case ID is M001. That is, the UI 850 is displayed when the "Edit" button 803 on the UI 800 is pressed in a state in which M001 is selected as the case ID, or when the "Generate New Case" button 802 is pressed and M001 is specified as the case ID.

The tab page 851 is a tab page for setting an overview of the case data. The term "overview of the case data" refers to the case name and a comment or the like. The tab page 852 is a tab page for performing settings for common data. As described above, the common data is data that is commonly set for the MFPs to be installed. Further, the common data also includes information showing the kind of MFP that the respective MFPs to be installed are. More specifically, the common data is a device ID of a device to be installed. As described above, the installation manager 721 inputs a device ID of a device to be installed for each case in S702, and the input operation is performed on the UI of the tab page 852. The tab page 853 is a tab page for performing settings for individual data. As described above, the individual data is set for each MFP to be installed. As described in the foregoing, the tab page 853 includes the controls 854 to 861 that are text boxes or buttons or the like.

A text box 854 is a text box for setting an individual data name. A combo box 855 is a combo box for setting a device ID of a device to be installed. If the individual data and a device ID of a device to be installed can be associated, the device ID of the device to be installed is entered in the combo box 855. As mentioned earlier, in many cases the positioning places of the MFPs are not decided until actually arriving at the customer's premises, and therefore there are many cases in which the individual data and the device ID of the device to be installed cannot be associated at the stage of editing the case data. Note that, if the device ID of the device to be installed of the relevant case is set in the tab page 852, the combo box 855 displays the device ID of the device to be installed as a selection choice.

A text box 856 is a text box for setting a device ID of an MFP to be removed. As mentioned in the foregoing, in the case of replacing an MFP, there are many cases in which a new MFP is installed in the same positioning place after the original MFP has been removed. Further, the MFP to be removed has already been installed in the customer's environment, and the positioning place as well as the device ID of the MFP to be removed can be identified by talking with the customer. Therefore, it is possible to associate the device ID of the MFP to be removed with individual data for which setting is desired in the MFP that is to be newly installed at the positioning place at which the MFP to be removed had been located. In the case of newly installing an MFP, and not replacing an MFP, the text box 856 for a device ID of a device to be removed may be left empty. Note that, association of the MFP to be removed and the MFP that is to be newly installed is performed with respect to the MFP to be removed and a new MFP that is intended to take over the user and usage conditions and the like (that is, take over the individual data settings) from the MFP to be removed, and it is not the case that one condition is that the positioning place must be the same. Further, associations between MFPs are not limited to one-to-one associations. For example, in the case of replacing a single MFP to be removed with a plurality of new MFPs, the single MFP to be removed can be associated with the plurality of MFPs that are to be installed. Conversely, in the case of replacing a plurality of MFPs to be removed with a single new MFP, the MFP that is to be newly installed can be associated with one MFP among the plurality of MFPs to be removed.

A button 857 is a button for displaying a screen on which to perform detailed settings for the individual data. A button 858 is a button for adding individual data that was set in the controls 854 to 857 to the case data. When the button 858 is pressed, the individual data is added to an individual data list 859. The individual data list 859 is a list for displaying individual data that has been already added to the case data that is currently being edited. A button 860 is a button for adding individual data from a file. When the button 860 is pressed, a UI for specifying a file is displayed. When a file of individual data is specified on the UI, the selected individual data is added to the case data that is currently being edited. A button 861 is a button for deleting individual data that is currently selected in the case data list 859 from the case data that is currently being edited. The button 862 is a button for saving the case data that is currently being edited. When the button 862 is pressed, the case management program 500 transmits the present case data to the case management server 105. Upon receiving the case data, the case management server program 550 of the case management server 105 stores the received case data in the case data storage unit 554. The button 863 is a button for cancelling editing of the case data.

<Data Structure of Case Data>

Figure 9:
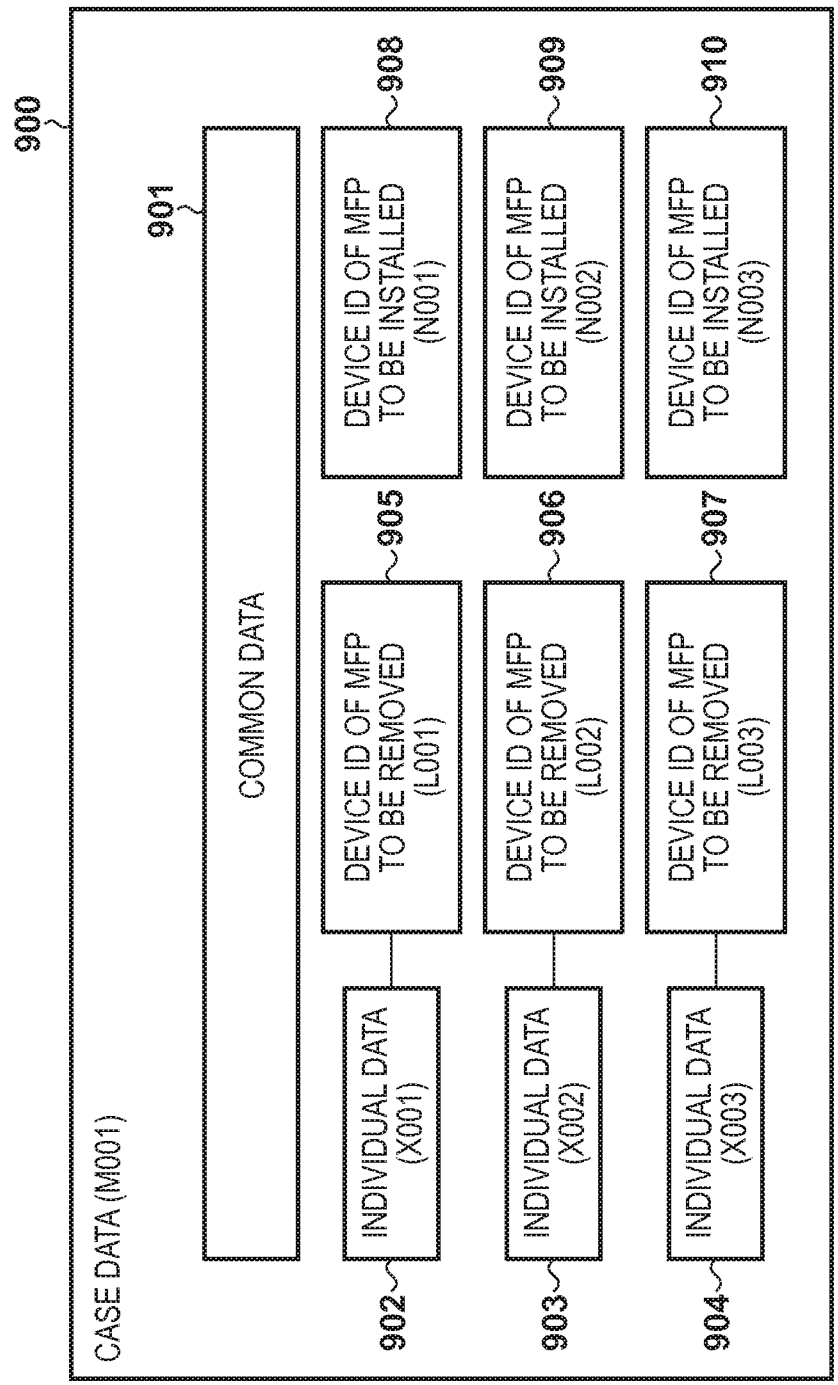
FIG. 9 is a view illustrating an example of the configuration of case data.

FIG. 9 is a conceptual diagram that represents the data structure of case data that the case management program 500 generates. Note that, in case data 900 in FIG. 9, case data for which the case ID is M001 is described as an example. The case data illustrated in FIG. 9 is data obtained by compiling the records of the respective tables of the case data in FIG. 6A to FIG. 6D for the respective cases. For example, when the client computer 104 transmits a case ID to the case management server 105, the case management server 105 searches in the tables illustrated in FIG. 6A to FIG. 6D for the specific case ID (for example, M001), and compiles the corresponding data for each case to obtain the case data shown in FIG. 9. The case management server 105 thereafter transmits the obtained case data to the client computer 104.

The case data 900 is constituted by common data 901, individual data 902, 903 and 904, device IDs of devices to be removed 905, 906 and 907, and device IDs 908, 909 and 910 of devices to be installed. Since the case data 900 is case data for which the case ID is M001, the data structure is for a case in which three MFPs are the objects for installation and there are also three MFPs as devices to be removed and replaced. The common data 901 is data that is commonly used for the plurality of MFPs. The individual data 902, 903 and 904 have setting values whose contents are respectively different to each other that are set for the respective MFPs. The common data 901 and the individual data 902, 903 and 904 are input by the sales representative 720 from the UI 850 of the case management program 500 in S701 in FIG. 7A. The device IDs of devices to be removed 905, 906 and 907 are also input by the sales representative 720 from the UI 850 of the case management program 500 in S701. Further, the device IDs 908, 909 and 910 of devices to be installed are identifiers that can identify the respective MFPs, and are input by the installation manager 721 in S702 in FIG. 7A and added to the case data 900. An association between the individual data 902 and the device ID 905 of a device to be removed is made in the case data 900. Further, an association between the individual data 903 and the device ID 906 of a device to be removed, and an association between the individual data ID 904 and the device ID 907 of a device to be removed are also made, respectively. However, the device IDs 908, 909 and 910 of devices to be installed are not associated with the individual data 902, 903 and 904. This is because the case data 900 illustrates an example in which the positioning places are not known until the MFPs are delivered to the customer's premises.

<Installation Data Write Processing>

Figure 10:
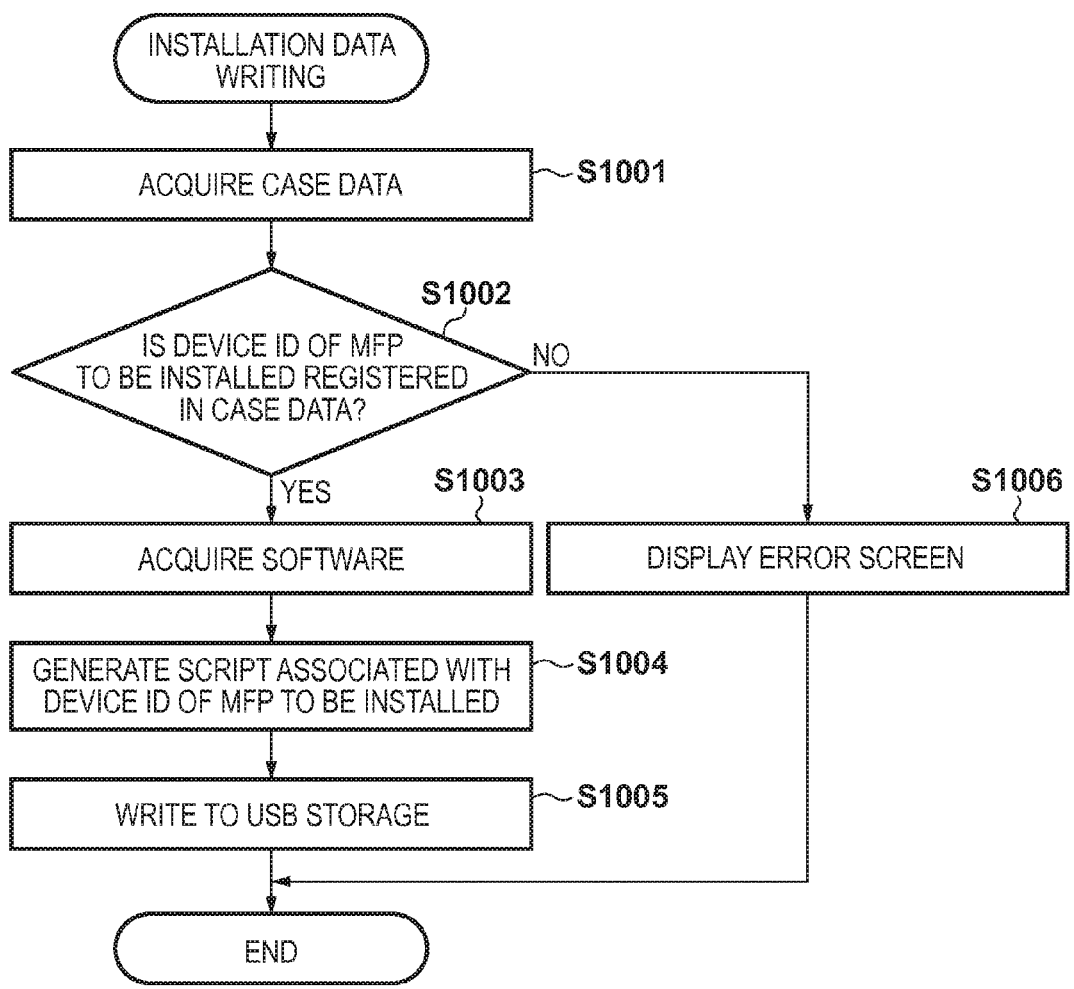
FIG. 10 is a flowchart illustrating processing for writing installation data to a USB storage.

FIG. 10 is a flowchart illustrating the flow of processing when the case management program 500 writes installation data to the USB storage 103. The installation data is data that includes case data, installation scripts, and various software groups that are necessary for installation. The installation data will be described in detail later using FIG. 11. Note that the present processing is performed in S703. That is, upon detecting that the button 804 on the UI 800 of the case management program 500 was pressed by the installation manager 721, the case management program 500 performs the processing illustrated in the flowchart in FIG. 10. When differences among the individual MFPs for a single case are limited to the individual settings data, one USB storage is sufficient as the USB storage to which the installation data is written, and the USB storage can be used in sequence for the MFPs that are to be replaced. In a situation in which there are a plurality of MFPs that are not all the same model, or in which even though the MFPs are the same model there are differences other than differences relating to the individual settings data, such as differences between the extension programs to be installed or the options to be activated, it is necessary to create installation data for the respective MFPs. In the present example, a case is described in which differences between the MFPs to be installed are limited to differences between the individual settings data.

In S1001, the communication unit 506 of the case management program 500 acquires case data from the case management server program 550 of the case management server 105, and thereafter the processing transitions to S1002. More specifically, the communication unit 506 of the case management program 506 makes a request by means of a "GET" command of the HTTP protocol to the communication unit 553 of the case management server program 550. When the communication unit 553 receives the "GET" command of the HTTP protocol, the control unit 551 of the case management server program 550 instructs the case data management unit 552 to acquire case data that is specified by a case data ID that is included in the GET command. The case data management unit of the case management server program 550 acquires the specified case data from the case data storage unit 554. The communication unit 553 of the case management server program 550 sends the acquired case data as a response to the "GET" command of the HTTP protocol to the communication unit 506 of the case management program 500. Thus, the processing to acquire case data in S1001 is performed. Note that, the case data acquired in S1001 is case data that is in a selected state in the case data list 801.

In S1002, the processing execution unit 502 determines whether a device ID of a device to be installed is included in the case data acquired in S1001. If a device ID of a device to be installed is included in the case data acquired in S1001, the processing transitions to S1003. If a device ID of a device to be installed is not included in the case data acquired in S1001, the processing transitions to S1006.

In S1003, the processing execution unit 502 acquires from the software management server 106 the software items (for example, firmware and license files or the like) that are required for installation based on the case data that was acquired in S1001. Note that, similarly to S1001, the communication between the case management program 500 of the client computer 104 and the software management server 106 is also performed using the HTTP protocol. When acquisition of the software is completed in S1003, the processing transitions to S1004.

In S1004, the script generation unit 505 receives an instruction from the processing execution unit 502 and generates an installation script for a device ID of each device to be installed. Thereafter, the processing transitions to S1005. The installation scripts generated in S1004 are described later using FIG. 12.

In S1005, upon receiving an instruction from the processing execution unit 502, the storage control unit 503 stores the case data acquired in S1001, the software acquired in S1003, and the installation scripts that were generated in S1004 on the USB storage 103, and thereafter ends the processing. The file configuration of the installation data that is written to the USB storage by the processing in S1005 will be described later using FIG. 11.

In S1006, upon receiving an instruction from the processing execution unit 502, the UI control unit 501 displays an error screen that notifies the user that a device ID of a device to be installed is not included in the acquired case data.

<Configuration of Installation Data>

Figure 11:
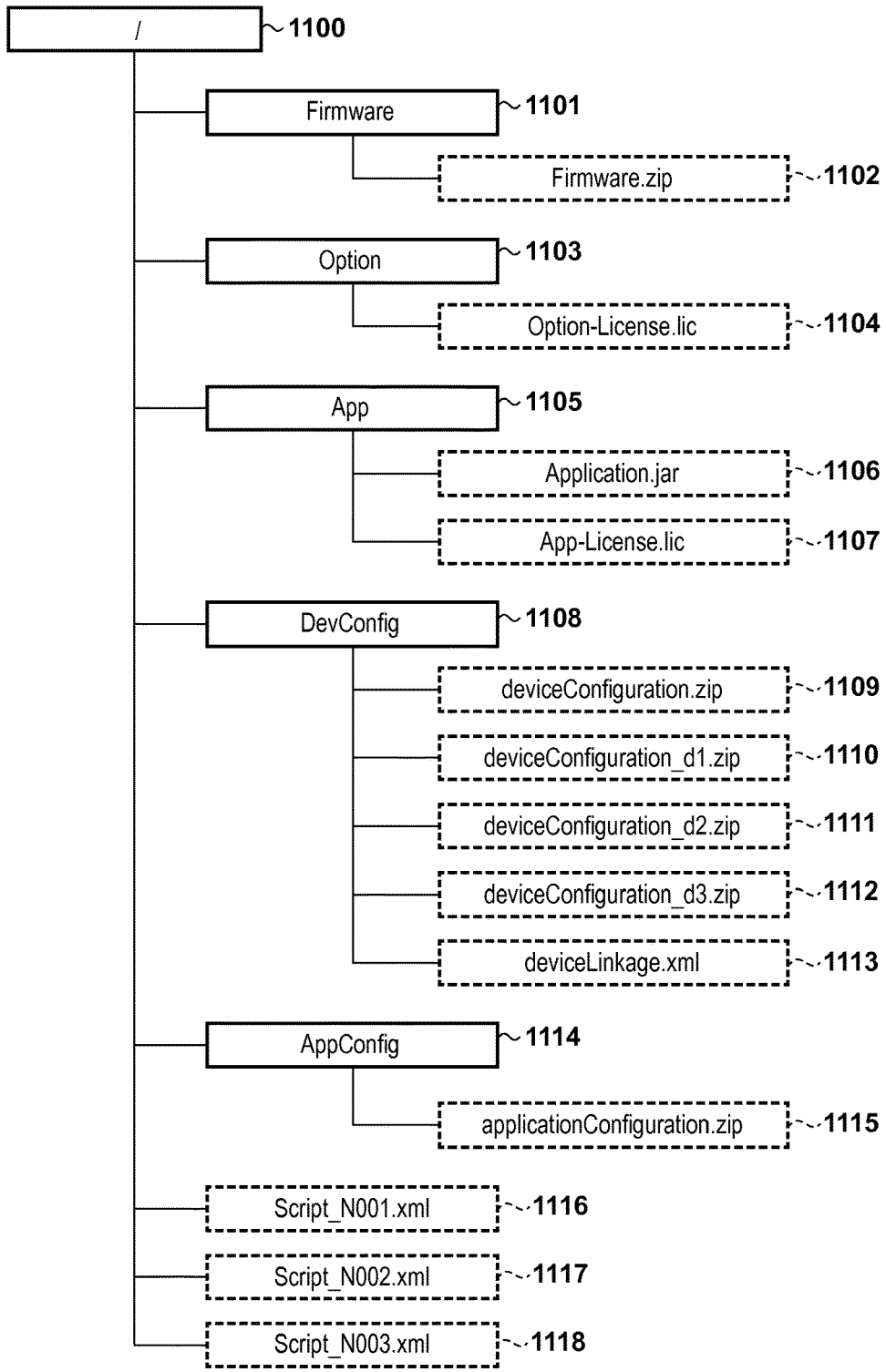
FIG. 11 is a view illustrating an example of the configuration of folders and files inside the USB storage.

FIG. 11 is a view illustrating the configuration of folders and files of installation data that is written to the USB storage 103 by the processing in S1005. Note that, FIG. 11 illustrates an example of case data for which the case data ID is M001.

A Firmware folder 1101, an Option folder 1103, and an App folder 1105 are present in a root folder 1100. A DevConfig folder 1108 and an AppConfig folder 1114 are also present in the root folder 1100. Further, Script_N001.xml 1116, Script_N002.xml 1117 and Script_N003.xml 1118 that are installation script files are present in the root folder 1100. The number of these installation script files that are present in the root folder 1100 corresponds to the number of MFPs to be installed. Since FIG. 11 illustrates an example of case data for which the case data ID is M001, there are installation script files for three MFPs in the root folder 1100.

The Firmware folder 1101 is a folder that stores firmware to be updated for the MFP 101. In the figure, a Firmware.zip file 1102 in which a firmware group is archived in ZIP format is present in the Firmware folder 1101.

The Option folder 1103 is a folder that stores a license file for enabling an optional function that is incorporated in advance into the native program 401. In the figure, an Option-License.lic 1104 that is a license file is present in the Option folder 1103. Although only one license file is illustrated in the figure, when enabling a plurality of optional functions, a license file for each optional function will be present in the Option folder 1103.

The App folder 1105 is a folder that stores an extension program 407 to be installed in the MFP 101 as well as a license file required for installing the extension program 407. In the figure, Application.jar 1106 that is one extension program 407 and App-License.lic 1107 that is a license file for the extension program 407 are present in the App folder 1105. Although only one extension program 407 and the license file for the extension program 407 are illustrated in the figure, when installing a plurality of extension programs, a plurality of extension programs as well as a plurality of corresponding license files will be present in the App folder 1105.

The DevConfig folder 1108 is a folder that stores device settings information relating to the overall MFP. In the figure, the device settings information is stored in the DevConfig folder 1108 as files archived in ZIP format. As described above, the device settings information includes both common data that is to be commonly set for all of the MFPs and individual data that is to be set for the individual MFPs. Both common data and individual data are present in the DevConfig folder 1108. In FIG. 11, a file deviceConfiguration.zip 1109 is common data, a file deviceConfiguration_d1.zip 1110 is individual data, a file deviceConfiguration_d2.zip 1111 is individual data, and a file deviceConfiguration_d3.zip 1112 is individual data. Further, a file deviceLinkage.xml 1113 that is an association file in which associations between individual data and device IDs are described is present in the DevConfig folder 1108. Note that, in the present example, the individual data is associated with device IDs of devices to be removed at the time point at which the data is written to the USB storage in the processing in S1005. A detailed description of the file deviceLinkage.xml 1113 at the time point at which the data is written to the USB storage in the processing in S1005 will be provided later using FIG. 13. Note that, although in the present example the association between individual data and device IDs is represented by preparing an association file, a different method may be adopted as long as the automatic installation program 450 can interpret the association, such as, for example, including the device ID in the file name of the individual data.

The AppConfig folder 1114 is a folder that stores application settings information relating to the extension program 407. The application settings information is provided by the Application.jar 1106 file. In the figure, a file application-Configuration.zip 1115 that is archived in ZIP format is present in the AppConfig folder 1114. With regard to the application settings information also, when there is a plurality of extension programs to be installed, a plurality of application settings information files that correspond to the respective extension programs will be present.

The Script_N001.xml 1116 file, Script_N002.xml 1117 file and file Script_N003.xml 1118 file are installation scripts that describe installation procedures for automatic processing of the installation operations. It is possible to determine for which MFP the respective installation scripts should be executed based on the file names. For example, the file Script_N001.xml 1116 is an installation script that should be executed for the MFP whose device ID is N001. By including a device ID of a device to be installed in the file name in this manner, the installation script is associated with the MFP at which the relevant installation script should be executed. Note that, in the present example, association between a device ID of a device to be installed and an installation script is performed by means of the file name of the installation script. However, the present invention is not limited to the aforementioned method, and a different method may be adopted as long as the automatic installation program 450 can interpret the association, such as separately preparing a file that shows the association between installation scripts and device IDs of devices to be installed. The installation scripts will be described in further detail later using FIG. 12. Note that, the configuration illustrated in the figure is merely exemplary, and the present invention is not limited thereto, and an arbitrary folder configuration may be adopted as long as the configuration can be interpreted by the automatic installation program 450 in accordance with the script analysis unit 454.

<Example of Installation Script>

FIG. 12 illustrates one example of an installation script that describes installation procedures for automatically implementing installation of the MFP 101. In particular, FIG. 12 illustrates an example of the Script_N001.xml 1116 shown in FIG. 11.

An installation script 1200 is read in by the storage control unit 452 of the automatic installation program 450, and is analyzed by the script analysis unit 454 via the processing execution unit 453. After the installation script 1200 is analyzed by the script analysis unit 454, the processing described by the installation script 1200 is executed by the processing execution unit 453. Note that, the installation script 1200 illustrated in FIG. 12 is generated by the processing in S1004 by the case management program 500 of the client computer 104. The installation script 1200 is described in XML (Extensible Markup Language), and is constituted by a case data identifying part 1201, an MFP identifying part 1202 and a process describing part 1210. Note that, although the script is expressed by XML in the present drawing, the script is not limited to XML, and may be written in a shell script or the like.

A case ID for identifying the case data is described in the case data identifying part 1201, and includes a <setupId> tag. The case ID is an identifier that is assigned to case data when the case data is generated by the case management program 500, and is a unique value with respect to all of the items of case data. Although in the present example the case ID is described by a character string of the four characters "M001" to simplify the description, it is desirable to use, for example, a GUID (global unique identifier).

A target identifier for identifying the MFP 101 to be installed is described in the MFP identifying part 1202, and includes a <deviceId> tag that is an identifier of the MFP 101.

The process describing part 1210 describes a processing group that is required for executing installation. The process describing part 1210 includes a firmware updating processing part 1203, an extension program installation processing part 1204, an extension program startup processing part 1205 and an option activation processing part 1206. The process describing part 1210 also includes a device settings information import processing part 1207, an application settings information import processing part 1208 and a reboot processing part 1209. An "order" attribute is included in a tag shown in the respective processing portions. In the example illustrated in the present drawing, the order of processing is determined in accordance with the value of the "order" attribute.

The firmware updating processing part 1203 is processing that updates firmware through the firmware updating service 403. The firmware updating processing part 1203 defines processing by the description in an <updateFirmwareCommand> tag, and designates the file to be used by means of a <dirPath> tag and a <firmwareName> tag. A relative path from the root folder 1100 to the firmware to be updated is described in the <dirPath> tag. The <firmwareName> tag designates the firmware to be updated. In the example illustrated in the figure, firmware archived in ZIP format is designated.

The extension program installation processing part 1204 defines processing by the description in an <installApplicationCommand> tag, and designates the extension program to be installed by means of a <dirPath> tag and an <appName> tag. A relative path from the root folder 1100 to the substance of the extension program to be installed is described in the <dirPath> tag. The <appName> tag designates the substance of the extension program to be installed. In the example illustrated in the figure, an extension program in a Jar file format is designated. Note that the format of the present extension program is not limited to the Jar file format.

A license for the extension program to be installed is designated by a <licenseDirPath> tag and a <licenseFileName> tag. A relative path from the root folder 1100 to the license file of the extension program is described in the <licenseDirPath> tag. The <licenseFileName> tag designates the substance of the license of the extension program. Although in the example illustrated in the figure a license file in a lic file format is designated, the file format of the license is not limited thereto.

The extension program startup processing part 1205 defines processing by the description in a <startApplicationCommand> tag, and designates the extension program that is the startup object by means of an <appId> tag. The <appId> tag designates an ID that uniquely identifies the extension program that is the startup object.

The option activation processing part 1206 defines processing by the description in an <activateOptionCommand> tag. The option activation processing part 1206 also designates the license file for the option that is to be activated by means of a <dirPath> tag and a <licenseFileName> tag. A relative path from the root folder 1100 to the license file for the option that is to be activated is described in the <dirPath> tag. Although in the example illustrated in the figure a license file in the lic file format is designated, the file format of the license is not limited thereto. Note that, if no optional functions are incorporated in advance into the MFP 101, or if optional functions are not to be enabled, the description of the present process is not required.

The device settings information import processing part 1207 defines processing by the description in an <importDeviceConfigCommand> tag. The device settings information import processing part 1207 also designates a device settings information file to be imported by means of a <dirPath> tag, a <comfileName> tag and a <exFileName> tag. A relative path from the root folder 1100 to the device settings information file that is the import object is described in the <dirPath> tag. A file with common data in the device settings information that is the import object is designated by the <comfileName> tag. In the example illustrated in the figure, a file with common data that is archived in Zip format is designated. Note that the format of the present device settings information file is not limited to the Zip file format. A file with individual data in the device settings information that is the import object is designated by the <exFileName> tag. Note that, "unknown" is described as the value in the <exFileName> tag of the installation script 1200, and this indicates that although there is processing to import individual data, the file with the individual data that is the import object has not been determined. The value "unknown" is described in the <exFileName> tag of the installation script 1200 in a case where the individual data and the device ID of the device to be installed are not associated.

The application settings information import processing part 1208 defines processing by the description in an <importAppConigCommand> tag. The application settings information import processing part 1208 also designates an application settings information file to be imported by means of a <dirPath> tag and a <fileName> tag. A relative path from the root folder 1100 to the application settings information file that is the import object is described in the <dirPath> tag. An application settings information file that is the import object is designated by the <fileName> tag. In the example illustrated in the figure, an application settings information file that is archived in Zip format is specified. Note that the format of the present application settings information file is not limited to the Zip file format.

The reboot processing part 1209 is configured by only a <rebootCommand> tag, and describes processing for causing the MFP to reboot and to reflect the settings of the device settings information and application settings information in the MFP after completion of a series of installation processing operations.

Note that, the description of the installation script illustrated in the present figure is not intended to limit the processing operations required for installation of an MFP, and as required the processing operations may overlap or may be increased or decreased.

<Example of Association File>

FIG. 13 illustrates an example of an association file that shows associations between individual data and device IDs, that is, association information, and is an example of the file deviceLinkage.xml 1113 in FIG. 11. An association file 1300 is an association file at a time point at which data is written to the USB storage in the processing in S1005. Although the respective associations between individual data and a device ID are expressed by XML in the present figure, expression of the association is not limited to XML. The association file 1300 is constituted by a case data identifying part 1301 and an individual data association list part 1302.

A case ID for identifying case data is described in the case data identifying part 1301, which is constituted by a <setupId> tag. In the present example, it is shown that the association file relates to case data for which the case ID is M001.

A plurality of associations between individual data and respective device IDs are described in the individual data association list part 1302. The respective associations between the individual data and the device IDs are defined by individual data association parts that are represented by an <exData> tag.

Individual data association parts 1303, 1304 and 1305 define associations between individual data and device IDs. An "id" attribute shows the ID of the individual data, and the <exData> tag shows which individual data association is being expressed. An <oldDeviceId> tag shows a device ID of a device to be removed. An <exFileName> tag shows the file name of the individual data. Note that, although in the present example the path specified in <dirPath> of the device settings information import processing part 1207 is described on the premise that a file for individual data exists, in a different case a configuration may be adopted in which the path to the individual data is described in an individual data association part. Taking the individual data association part 1303 as an example, it is shown that individual data for which the individual data ID is X001 is associated with an MFP for which the device ID is L001. Further, in the individual data association part 1303, it is shown that the file name of the individual data is deviceConfiguration_d1.zip.

<Processing by Automatic Installation Program>

Next, processing of the automatic installation program 450 of the MFP 101 and MFP 102 will be described using FIG. 14A to FIG. 17D. Note that the present processing is processing of the automatic installation program 450 that is performed when the person in charge of installation 722 performs operations to remove MFPs in S704 and performs operations to install MFPs in S705.

Figure 14A:
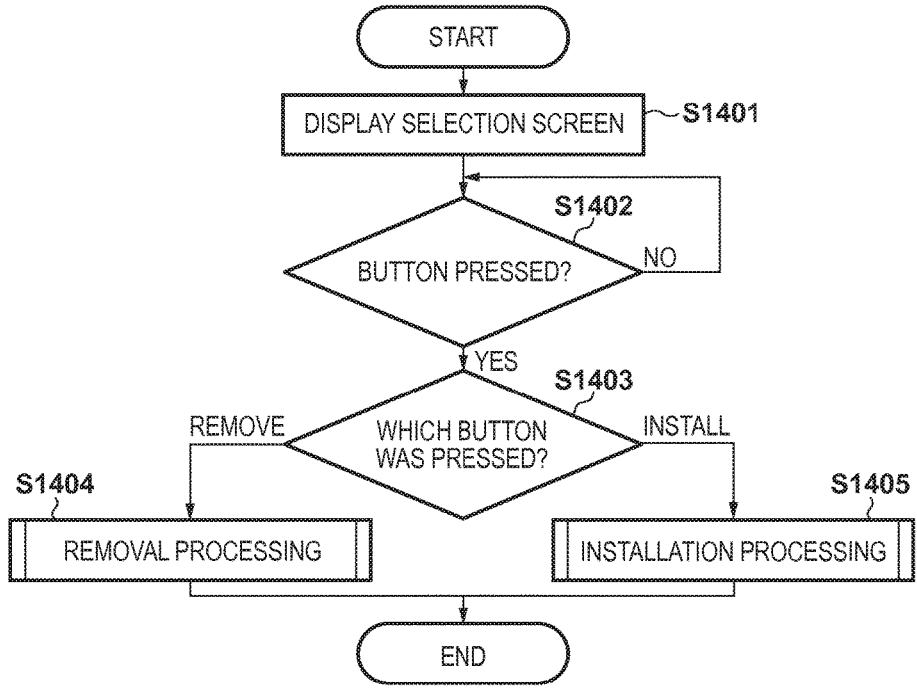
FIG. 14A and FIG. 14B are views showing a flowchart that illustrates processing of an automatic installation program, and a UI.

The automatic installation program 450 performs the processing illustrated in the flowchart in FIG. 14A when the storage control unit 452 of the automatic installation program 450 detects that the USB storage 103 was connected to the MFP 101 or to the MFP 102.

Figure 14B:
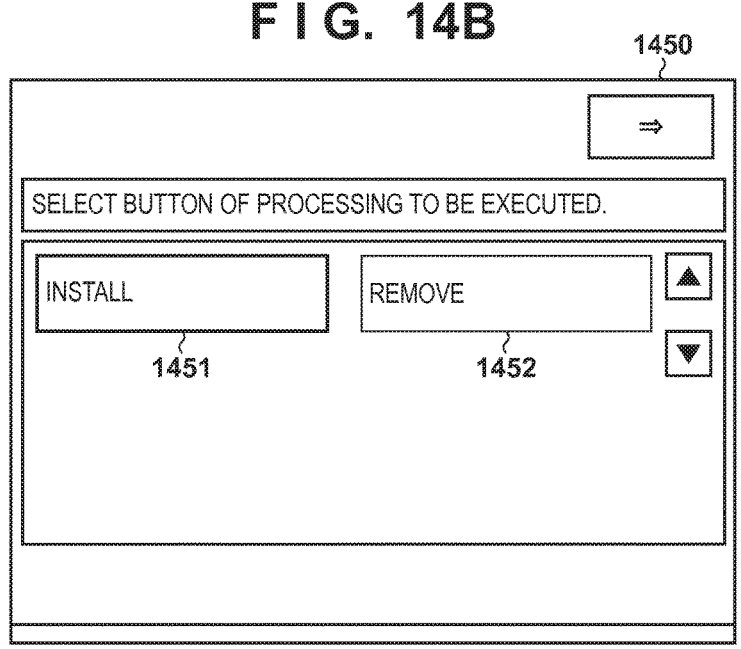

In S1401, the UI control unit 451 receives an instruction of the processing execution unit 453, and displays a UI that is illustrated in FIG. 14B. FIG. 14B illustrates one example of a UI that the UI control unit 451 of the automatic installation program 450 displays in S1401. A UI 1450 includes a button 1451 and a button 1452. The button 1451 is a button for executing processing at a time of installation. Note that, in the present example, in S705, the person in charge of installation 722 presses the button 1451 that is displayed on the UI 1450 of the automatic installation program 450 of the MFP 101. The button 1452 is a button for executing processing at a time of removal. Note that, in the present example, in S704, the person in charge of installation 722 presses the button 1452 that is displayed on the UI 1450 of the automatic installation program 450 of the MFP 102. The foregoing is a description of the UI 1450. The description will now revert to the flowchart in FIG. 14A.

In S1402, the UI control unit 451 monitors whether a button has been pressed. If the UI control unit 451 detects that a button was pressed, the processing transitions to S1403. If a button is not pressed, the UI control unit 451 continues the monitoring operation.

In S1403 the UI control unit 451 determines whether the pressed button is the button 1451 or the button 1452. If the pressed button is the button 1451, the processing transitions to S1404. If the pressed button is the button 1452, the processing transitions to S1405. In S1404, the automatic installation program 500 executes the processing for a time of removing an MFP, and thereafter ends the present processing. The processing in S1404 will be described in detail later using FIG. 15A. In S1405, the automatic installation program 500 executes the processing for a time of installing an MFP, and thereafter the present processing ends. The processing in S1405 will be described in detail later using FIG. 15B, FIG. 16 and FIG. 17A to FIG. 17D.

Figure 15A:
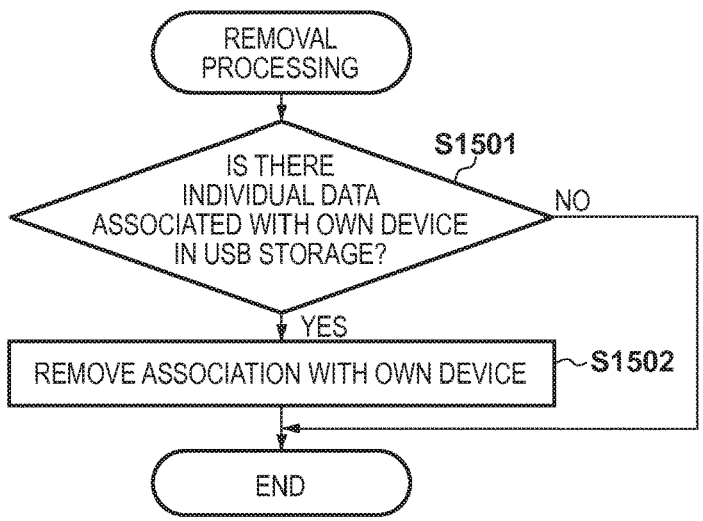
FIG. 15A and FIG. 15B are flowcharts illustrating processing for removing an MFP and installing an MFP.

FIG. 15A is a flowchart illustrating the processing of the automatic installation program 500 that is performed in S1404.

In S1501, the processing execution unit 453 whether or not there is individual data associated with its own device in the USB storage 103. If there is an association, the processing transitions to S1502. If there is no association, the processing ends. Note that, in the present example, a determination as to whether or not there is an association is performed by analyzing the association file 1300. For example, if the device ID of the MFP performing the processing in S1501 is L001, since the value of the <oldDeviceID> tag is L001 in the individual data association part 1303 of the association file 1300, it is determined that there is an association.

In S1502, the processing execution unit 453 removes the association with its own device, and ends the processing. More specifically, if it is determined that there is an association in S1501, the processing execution unit 453 removes the association with the individual data that is described in the association file 1300. The USB control unit 451 saves the association file 1300 from which the association has been removed in the USB storage 103. Note that, in the present example, removal of the association is performed by deleting the <oldDeviceID> tag in the association file 1300. The foregoing is a description of the processing when removing an MFP.

Figure 15B:
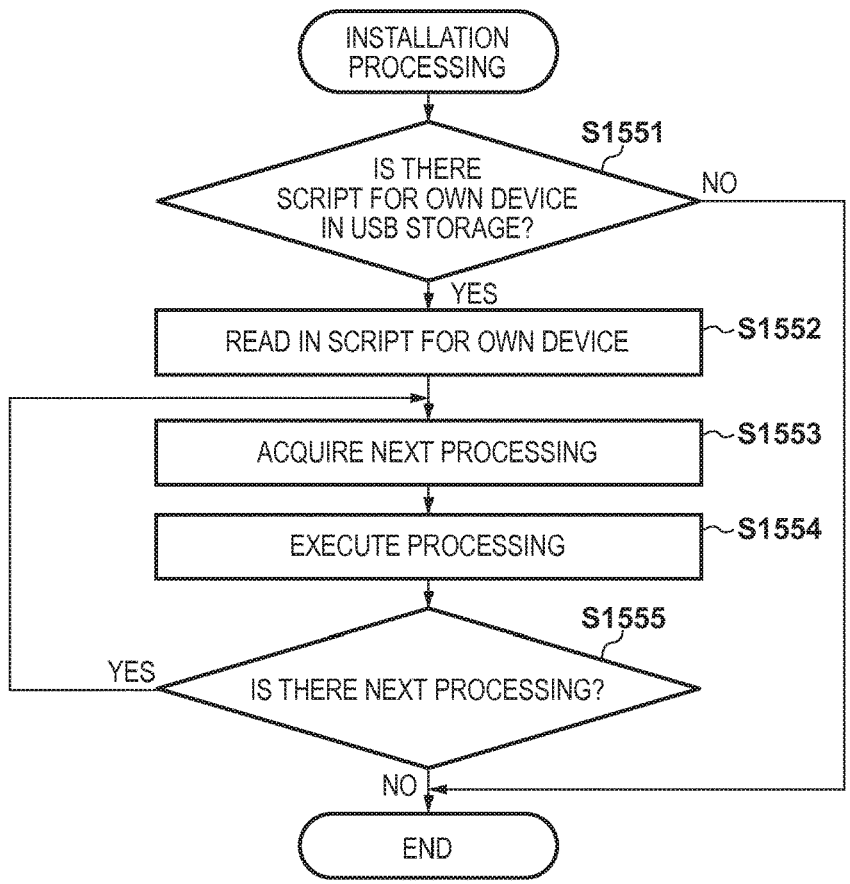

Next, the processing when installing an MFP will be described using FIG. 15B to FIG. 17D. FIG. 15B is a flowchart illustrating processing of the automatic installation program 500 in S1405.

In S1551, the processing execution unit 453 determines whether or not an installation script for its own device is present in the USB storage 103. If there is an installation script for its own device, the processing transitions to S1552. If there is not an installation script for its own device, the processing ends. Note that, in the present example, whether or not there is an installation script for its own device is determined based on the file name of the installation scripts. For example, if the device ID of the MFP performing the processing in S1551 is N001, since the script file name Script_N001.xml 1116 that includes the device ID of its own device is present in the USB storage 103, the processing execution unit 453 determines that there is an installation script for its own device.

In S1552, the processing execution unit 453 reads in the installation script for its own device that was specified in S1551, and the processing thereafter transitions to S1553.

In S1553, the script analysis unit 454 acquires the processing that is to be executed, and passes the acquired processing to the processing execution unit 453. Subsequently, the processing transitions to S1554. Note that, as described above using FIG. 12, the various kinds of processing are described in the process describing part 1210, and the execution order is the order specified by the respective "order" attributes described in the various processing portions.

In S1554, the processing execution unit 453 executes the processing that was passed thereto in S1553. Subsequently, the processing transitions to S1555. Note that, details of the processing executed in S1553 in a case where the processing is for importing device settings information is described below using FIG. 16 and FIG. 17A to FIG. 17D.

In S1555, the script analysis unit 454 determines or not there is processing that should be executed next. If there is processing that should be executed next, the processing transitions to S1553. If there is no processing that should be executed next, the script analysis unit 454 ends the present processing.

<Processing to Import Device Settings Information—Part 1>

FIG. 16 is a flowchart illustrating processing of the automatic installation program 450 in a case where the processing executed in S1554 was processing to import device settings information.

In S1601 the processing execution unit 453 imports common data, and the processing thereafter transitions to S1602. The common data with respect to which importing is performed in S1601 is a file specified in <comfileName> of the device settings information import processing part 1207.

In S1602, based on an analysis result of the script analysis unit 454, the processing execution unit 453 determines whether a path of individual data is described in the device settings information import processing part 1207. If a path of individual data is described, the processing transitions to S1603. If a path of individual data is not described, the processing transitions to S1604. Note that, in the present example a determination as to whether a path of individual data is described is made based on the <exFileName> tag of the device settings information import processing part 1207. For example, taking the installation script 1200 as an example, the value of the <exFileName> tag of the device settings information import processing part 1207 is "Unknown", and therefore a file name of individual data is not specified. Consequently, it is determined that a path of individual data is not described.

In S1603, the processing execution unit 453 performs processing to import the individual data file specified by the <exFileName> tag. Subsequently, the processing transitions to S1612.

In S1604, the processing execution unit 453 determines whether there is individual data that is not associated with a device ID of a device to be removed. If there is individual data that is not associated with a device ID of a device to be removed, the processing transitions to S1605. If there is no individual data that is not associated with a device ID of a device to be removed, the processing transitions to S1609. In the present example, a determination as to whether or not there is individual data that is not associated with a device ID of a device to be removed is made based on the association file 1300. More specifically, an operation is performed to check whether the <oldDeviceId> tag is present in each individual data association part. If there is even one individual data association part in which the <oldDeviceId> tag is not present, the processing transitions to S1605. In a situation in which the operations in S704 are performed, the association between individual data and a device ID of a device to be removed is removed in the processing in S1502.

In S1605, the processing execution unit 453 determines whether the number of individual data items that are not associated with a device ID of a device to be removed is one. If the number of individual data items that are not associated with a device ID of a device to be removed is one, the processing transitions to S1606. If there is a plurality of individual data items that are not associated with a device ID of a device to be removed, the processing transitions to S1609.

Figure 17A:
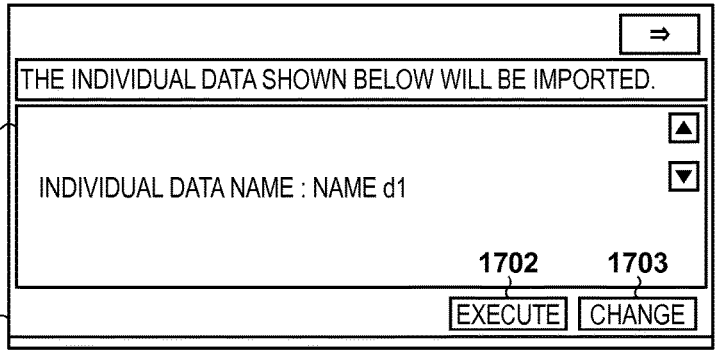
FIG. 17A, FIG. 17B, FIG. 17C and FIG. 17D are views illustrating an example of a UI of an automatic installation program.

In S1606, to prompt the user to confirm execution of an operation to import individual data, the UI control unit 451 displays a UI 1700 that is shown in FIG. 17A, and the processing transitions to S1607. FIG. 17A illustrates an example of the UI that the UI control unit 451 displays in S1606. The UI 1700 includes an individual data information display region 1701, a button 1702 and a button 1703. The individual data information display region 1701 is a region that displays information of individual data. In the present example, the individual data information display region 1701 displays the fact that the individual data name of the individual data for which importing is to be performed hereafter is "name d1". The individual data that is displayed here is individual data that is not associated with a device ID of a device to be removed. Further, since the result determined in the processing in S1605 is that the number of individual data items not associated with a device ID of a device to be removed is only one, the information of one individual data item is displayed. The button 1702 is a button for executing the import of the individual data that is displayed in the individual data information display region 1701. The button 1703 is a button for changing the individual data to be imported to different individual data from the individual data that is being displayed in the individual data information display region 1701. Thus, by the person in charge of installation 722 performing the operations in S705 after performing the operations in S704, it is no longer necessary for the person in charge of installation 722 to perform a selection with respect to individual data, and therefore the time and labor required to make a selection as well as selection mistakes are eliminated.

The description will now revert to FIG. 16. In S1607, the UI control unit 451 determines which button was pressed on the UI 1700. If the "Execute" button 1702 was pressed, the processing transitions to S1608. If the "Change" button 1703 was pressed, the processing transitions to S1609.

In S1608, the processing execution unit 453 executes importing of the individual data that is not associated with a device ID of a device to be removed that had been displayed in the UI display region 1701, and the processing transitions to S1612.

In S1609, the UI control unit 451 displays a UI for selecting individual data, and the processing transitions to S1610. Note that, since the UI that is displayed differs depending on the transition origin, the UI will be described using FIG. 17B, FIG. 17C and FIG. 17D.

Figure 17B:
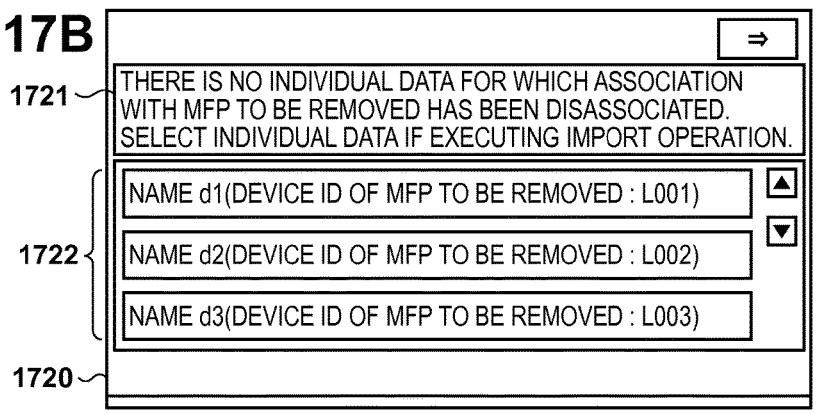

FIG. 17B is an example of a UI that the UI control unit 451 displays in S1609 after transitioning from S1604. In the case of transitioning from S1604, the state is one in which all of the items of individual data are associated with respective device IDs of devices to be removed. This state is entered in a case where the person in charge of installation 722 performed the operations in S705 without performing the operations in S704. A UI 1720 is constituted by a warning display region 1721 and an individual data selection region 1722. The warning display region 1721 is a region that displays a message that warns the user to the effect that all of the items of individual data are associated with device IDs of devices to be removed. The individual data selection region 1722 is a region that displays buttons for selecting individual data to import. All the items of individual data that are associated with device IDs of devices to be removed are displayed in the individual data selection region 1722. In the example of the UI 1720, three buttons are displayed. Further, a device ID of a device to be removed that is associated with the individual data name of the individual data is displayed in the button. Note that, although in the present example the UI 1720 is displayed to enable the selection of individual data for which to perform an import operation, a configuration may also be adopted so as to generate an error in a case where all of the items of individual data are associated with device IDs of devices to be removed.

Figure 17C:
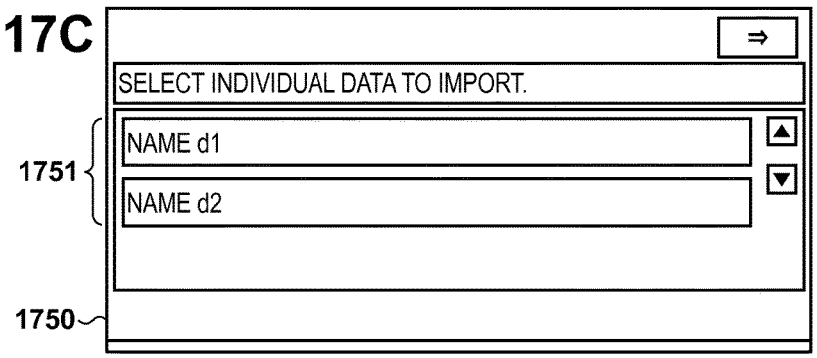

FIG. 17C is an example of a UI that the UI control unit 451 displays in S1609 after transitioning from S1605. In the case of transitioning from S1605, the state is one in which there are a plurality of items of individual data that are not associated with device IDs of devices to be removed. This state is entered in a case where the person in charge of installation 722 did not perform the operations in S704 and S705 alternately, but rather performed the operations in S704 a plurality of times and thereafter performed the operations in S705. A UI 1750 includes an individual data selection region 1751. The individual data selection region 1751 is a region that displays buttons for selecting individual data to be imported. Only individual data that is not associated with a device ID of a device to be removed is displayed in the individual data selection region 1751. Taking the UI 1750 as an example, there are two items of individual data that are not associated with a device ID of a device to be removed, and two buttons are displayed for selecting the two items of individual data. The individual data name of the individual data is displayed in the button.

Thus, even in a case where the person in charge of installation performs the removal operations in S704 a plurality of times and thereafter performs the operations in S705, the selection choices are decreased by displaying only individual data that is not associated with a device ID of a device to be removed, and therefore the time and labor required to select individual data as well as selection mistakes are reduced.

Further, a UI that is the same as the UI 1750 is also displayed in a case where MFPs are being newly installed without replacing MFPs. In a case where all the MFPs are being newly installed, since all of the items of individual data are not associated with a device ID of a device to be removed, all of the items of individual data are displayed in the individual data selection region 1751. Consequently, although time and labor is required for the selection, even in a case where all the MFPs are being newly installed, installation of the MFPs can be performed by selection of the individual data by the user.

Figure 17D:
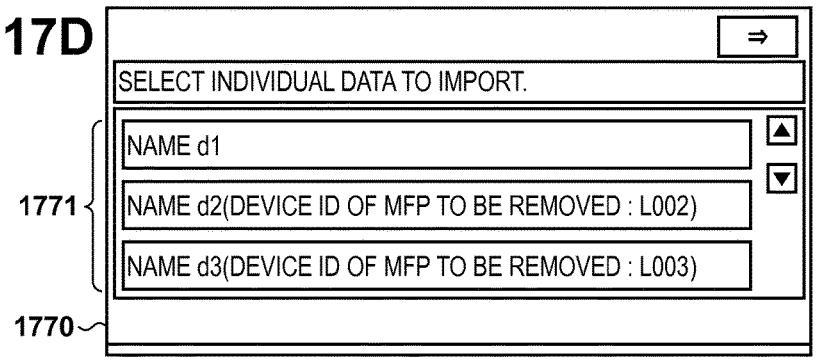

FIG. 17D illustrates an example of a UI that the UI control unit 451 displays in S1609 after transitioning from S1607. The UI 1770 includes an individual data selection region 1771. The individual data selection region 1771 is a region that displays buttons for selecting individual data to be imported. Both individual data that is not associated with a device ID of a device to be removed and individual data that is associated with a device ID of a device to be removed are displayed together in the individual data selection region 1751. Taking the UI 1770 as an example, there is one item of individual data that is not associated with a device ID of a device to be removed, and the individual data name is displayed in the button for that individual data item. Further, there are two items of individual data that are associated with a device ID of a device to be removed on the UI 1770, and the relevant individual data name and device ID of the device to be removed associated with the relevant individual data are displayed in the respective buttons for the two individual data items.

The description will now revert again to FIG. 16. In S1610, the UI control unit 451 monitors whether an operation has been performed to select individual data by pressing a button on the UI that is displayed in S1609. If the UI control unit 451 detects that individual data was selected, the processing transitions to S1611. If the UI control unit 451 does not detect an operation to select individual data, the UI control unit 451 continues the monitoring operation.

In S1611, the processing execution unit 453 executes importing of the individual data with respect to which selection was detected in S1610, and the processing transitions to S1612.

In S1612, the processing execution unit 453 associates the device ID of its own device with the imported individual data, and thereafter the processing ends. More specifically, the processing execution unit 453 performs an operation to associate the device ID of its own device and the individual data in the association file 1300. The association operation is, for example, performed by inserting a <newDeviceId> tag in which the device ID of its own device is described in an <exData> tag of the imported individual data. That is, in the association file 1300 illustrated in FIG. 13, the <newDeviceId> tag in which the ID of the device that imported the relevant individual data is described is inserted in place of the <oldDeviceId> tag with which the imported individual data had been associated. The storage control unit 452 thereafter stores the association file 1300 to which the association was added in the USB storage 103. Association of the device ID of the device to be installed and the individual data is performed by the processing in S1612.

The foregoing is a description relating to detailed processing of the respective programs during the basic installation operations described in FIG. 7A.

<Procedures after MFP Replacement Operations>

Figure 7B:
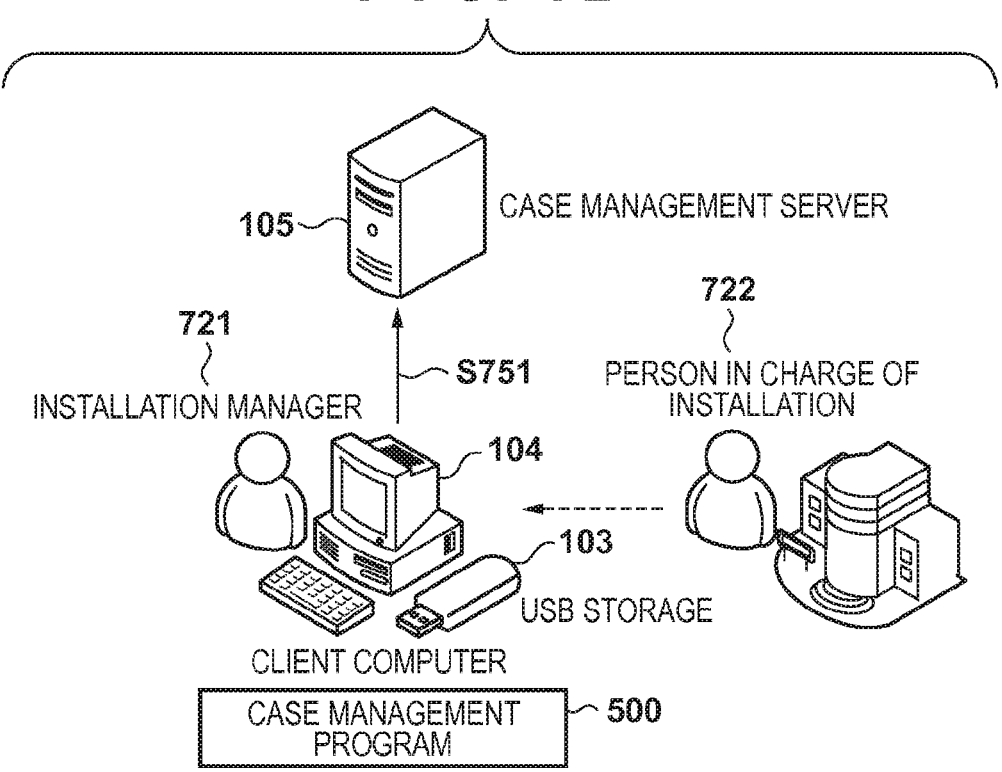

Next, FIG. 7B will be described. FIG. 7B is a workflow diagram that describes a workflow after installing the MFPs 101 according to the present invention.

In S705 in FIG. 7A, when installing the MFPs 101, in the processing in S1612 in FIG. 16, the processing execution unit 453 of the automatic installation program 450 associates the device ID of an MFP with respect to which installation was performed with the individual data that was imported. The person in charge of installation 722 returns the USB storage 103 which contains the updated association file 1300 to the installation manager 721.

In S751 the installation manager 721 connects the returned USB storage 103 to the client computer 103, and uses the case management program 500 to read in the association file and upload the association file to the case management server 104, to thereby complete the operations. The detailed processing of the respective programs in the operations after installation that have been described using FIG. 7B will now be described using FIG. 18A to FIG. 18B.

FIG. 18A illustrates an example of an association file that is stored in the USB storage 103 after all of the operations to install the MFPs 101 that is described above using FIG. 7A have been completed. An association file 1800 is updated from the association file 1300 by the processing of the automatic installation program 450 shown in FIG. 7A. The difference in the association file 1800 relative to the association file 1300 illustrated in FIG. 13 is that the <newDeviceId> tag is added to each individual data association part, and the <oldDeviceId> tag has been deleted from each individual data association part. The <newDeviceId> tag is added by the processing in S1612, and the <oldDeviceId> tag is deleted by the processing in S1502. In the example in FIG. 18A, three items of individual data having the names X001, X002 and X003 indicate association files after being installed in the devices with the IDs N001, N002 and N003, respectively.

FIG. 18B is a flowchart illustrating processing of the case management program 500 of the client computer 104 and the case management server program 550 of the case management server 105 during operations performed in S751. Processing from S1851 to S1855 is processing of the case management program 500.

In S1851, the storage control unit 503 of the case management program 500 reads in the association file 1800 that is stored on the USB storage 103, and the processing transitions to S1852.

In S1852, the communication unit 506 transmits the association file 1800 that was read in S1851 to the case management server 105, and the processing transitions to S1853.

In S1853 the communication unit 506 monitors whether a transmission result for the association file 1800 that was transmitted in S1852 is received from the case management server 105. If a result is received, the processing transitions to S1854. If a result has not been received, the communication unit 506 continues the monitoring operation.

In S1854, the processing execution unit 502 determines whether or not the result received in S1853 is to the effect that transmission was successful. If the result received in S1853 is that transmission was successful, the processing execution unit 502 ends the processing. If the result received in S1853 is that transmission failed, the processing transitions to S1855.

In S1855, the UI control unit 501 displays an error screen to convey a message to the effect that transmission of the association file failed, and thereafter the processing ends.

The processing from S1871 to S1877 is processing of the case management server program 550 of the case management server 105.

In S1871, the communication unit 553 of the case management server program 550 monitors whether the association file was received. If the association file was received, the processing transitions to S1872. If the association file has not been received, the communication unit 553 of the case management server program 550 continues the monitoring operation.

In S1872, the control unit 551 reads in the association file 1800 that was received in S1871, and the processing transitions to S1873.

In S1873, the case data management unit 552 updates all the associations between individual data and device IDs of devices to be installed, and the processing transitions to S1874. More specifically, the case data management unit 552 adds the value of the <newDeviceId> tag described in the respective individual data association parts of the association file 1800 to the column 674 of the individual data management table 670 of the case data storage unit 554. Thus, the respective items of individual data and the device IDs of devices to be installed are associated. Further, the case data management unit 552 updates the value in the column 603 of the record for the relevant case in the case overview management table 600 from "not complete" to "complete".

In S1874, the control unit 551 determines whether the processing in S1873 was successful. If the processing was successful, the processing transitions to S1875. If the processing failed, the processing transitions to S1876.

In S1875, the control unit 551 sets the result to be transmitted to the client computer 140 to a result indicating the processing was successful, and the processing transitions to S1877.

In S1876, the control unit 551 sets the result to be transmitted to the client computer 140 to a result indicating the processing failed, and the processing transitions to S1877.

In S1877, the communication unit 553 transmits the result to the client computer 140, and ends the processing.

By executing the processing described in FIG. 18A to FIG. 18B, individual data and device IDs of devices to be installed are also associated with respect to the case data that is managed by the case management server program 550 of the case management server 105. Consequently, at the case management server program 550 of the case management server 105 also, it is known which MFP is actually operating in accordance with which individual data.

Thus, according to the present embodiment, even in a situation in which individual data and a device ID of an MFP to be installed are not associated in advance, appropriate installation can be implemented automatically during installation that is performed when replacing an MFP.

[Embodiment 2]

In Embodiment 1, the automatic installation program 450 of the MFP 102 to be removed removes the association between its own device and the individual data that is associated therewith. Further, the automatic installation program 450 of the MFP 101 to be installed identifies and imports the individual data that is not associated with the MFP to be removed, to thereby realize automatic implementation of the appropriate installation. According to Embodiment 2 an example is described in which the automatic installation program 450 of the respective MFPs 102 to be removed not only removes the association with the individual data that is linked with its own device, but also adds the time and order of removing the association to the association file. The system configuration, hardware configuration, software configuration, table configuration, configuration of the case data and the installation scripts and the like are the same as in Embodiment 1, and hence a description thereof will be omitted hereunder. The difference in Embodiment 2 relative to Embodiment 1 is the processing of the automatic installation program 450 during the operations in S704 and S705.

Figures 19A, 19B:
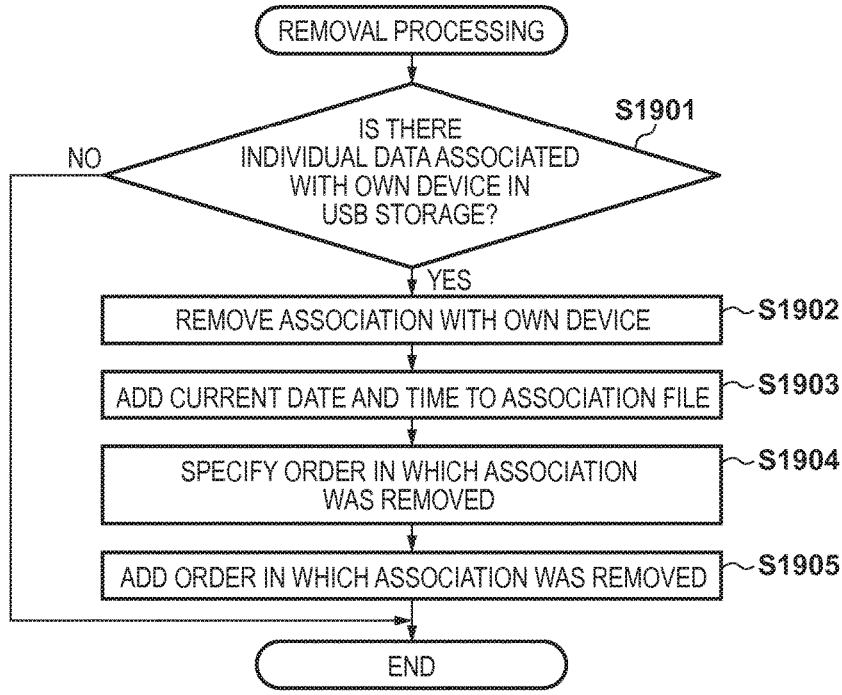
FIG. 19A and FIG. 19B are views illustrating a different example of removal processing of an automatic installation program.

FIG. 19A illustrates processing of the automatic installation program 450 during operations at a time of removing MFPs in S704. In the present embodiment, in step S1404 in FIG. 14A, the processing illustrated in FIG. 19A is executed in place of the processing illustrated in FIG. 15A. Therefore, the portion of the processing that differs from the processing in FIG. 15A described in Embodiment 1 will now be described. The processing in S1901 and S1902 is the same as in S1501 and S1502, and hence a description thereof is omitted here.

In S1903, the processing execution unit 453 adds the current date and time to the association file 1300, and the processing transitions to S1904.

In S1904, the processing execution unit 453 specifies the order in which the association was removed, and the processing transitions to S1905. It is sufficient to specify the order by, for example, taking a next value after a largest value among the <order> tags that indicate the order that have already been added to the association file 1300 as the order to be specified in S1904. The next value is, for example, a value obtained by adding 1 to the largest value. If the <order> tag cannot be found, the initial value of the order, for example, 1, is specified as the order.

In S1905, the processing execution unit 453 adds the order in which the association was removed that was specified in S1904, and thereafter the processing ends.

FIG. 19B illustrates an association file at a time point after performing the operations in S704. An association file 1950 is a file obtained by updating the association file 1300 by the processing in FIG. 19A. Individual data association parts 1951, 1952 and 1953 indicate the same individual data as the individual data association parts 1303, 1304 and 1305, respectively.

A tag 1954 is a <date> tag, and represents a date and time at which an association with a device ID of a device to be removed was removed. The present tag is added in the processing in S1903. A tag 1955 is an <order> tag, and represents the order in which the device ID of the device to be removed was removed. The present tag is added in the processing in S1905. Further, in the processing in S1904, the order in which the association was removed is specified by checking the present tag in the respective individual data association parts. Taking the association file 1950 as an example, it is found that an association with a device ID of a device to be removed was removed in the individual data association parts 1951 and 1952, and that the individual data association part 1953 is associated with a device ID of a device to be removed. Therefore, the association file 1950 is an association file after the person in charge of installation 722 performed the operations in S704 twice.

<Device Settings Information Import Processing in Embodiment 2>

Figure 20:
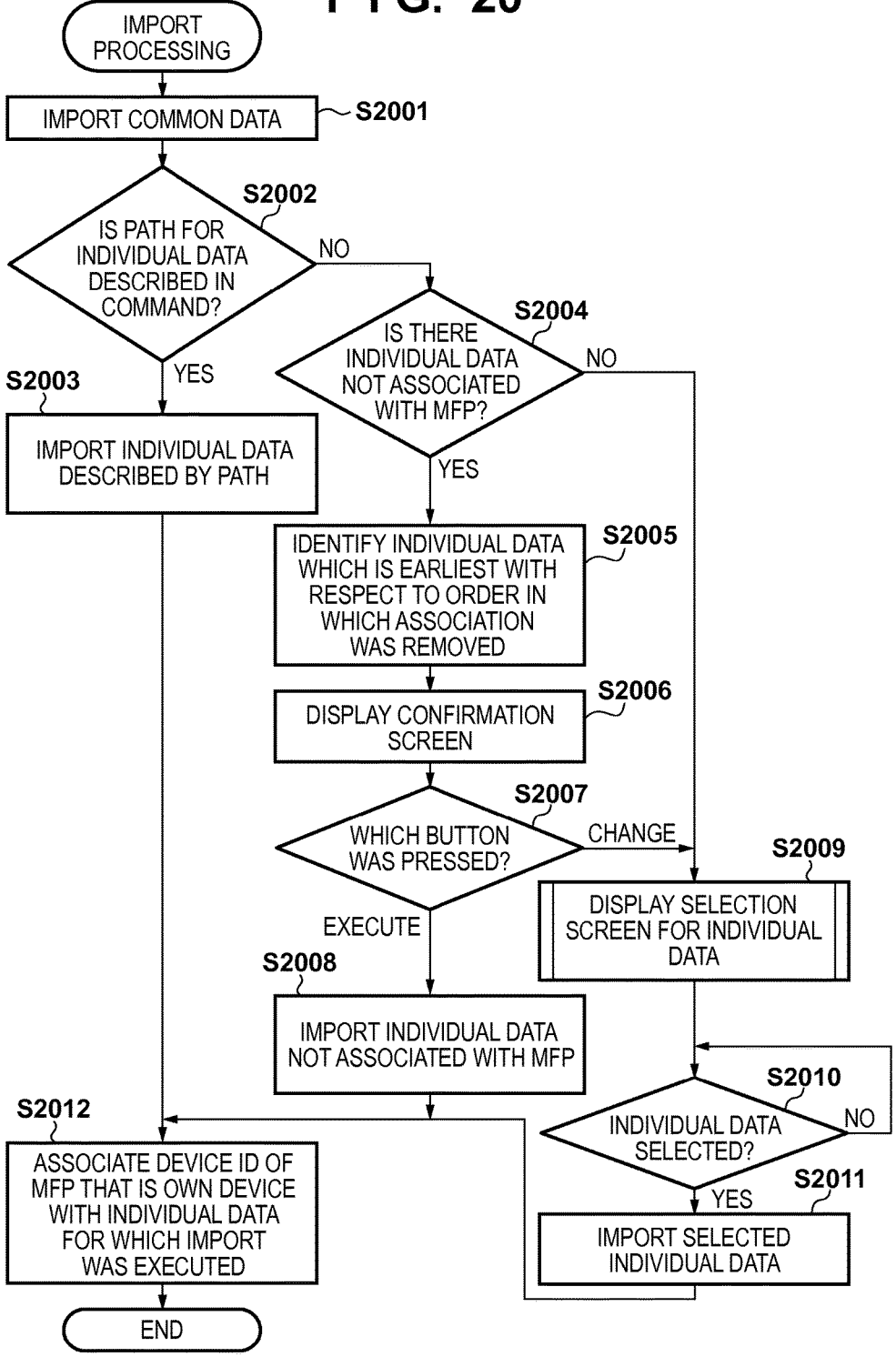
FIG. 20 is a view illustrating a different example of processing to import device setting information.

FIG. 20 is a flowchart of processing of the automatic installation program 450 during the operations at the time of installation in S705. The processing illustrated in FIG. 20 corresponds to the processing in FIG. 16 that was described in Embodiment 1, and hence only portions that are different to FIG. 16 are described hereunder. The processing in S2001 to S2004 is the same as in S1601 to 1604, and hence a description thereof is omitted here.

In S2005 the processing execution unit 453 identifies the individual data which is earliest with respect to the order in which an association was removed. Thereafter, the processing transitions to S2006. In the present example, the individual data which is earliest with respect to the order in which associations were removed is identified by identifying the smallest value among the <order> tags of the respective individual data association parts described in FIG. 19B.

Figure 21:
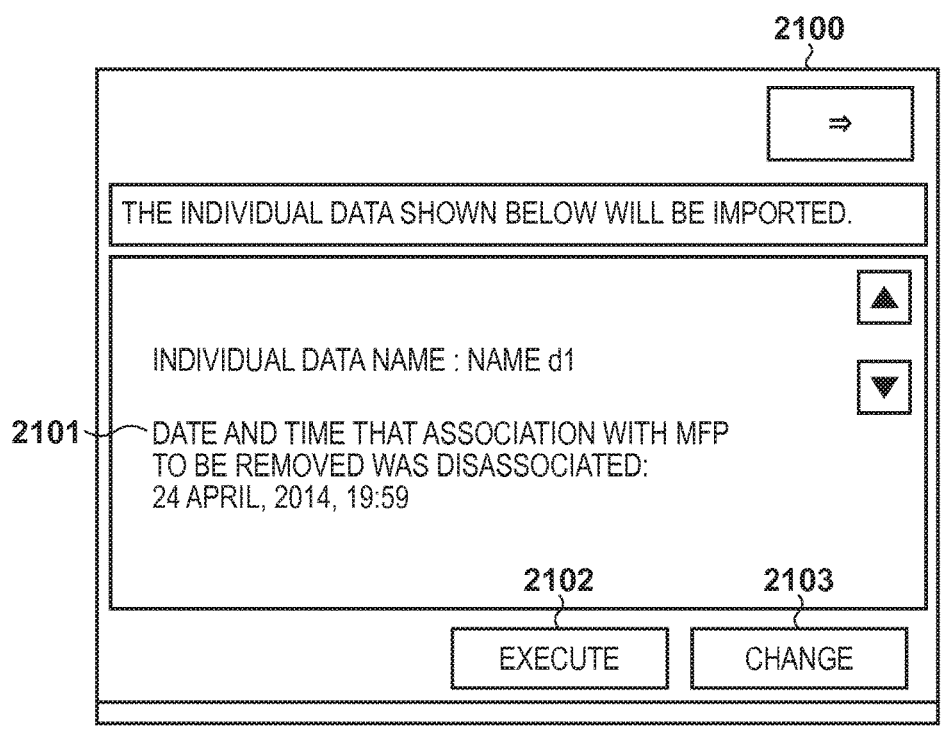
FIG. 21 is a view illustrating a different example of a UI of an automatic installation program.

In S2006, to prompt the user to confirm execution of the operation to import individual data, the UI control unit 451 displays a UI 2100 that is shown in FIG. 21. Thereafter, the processing transitions to S2007. FIG. 21 will now be described. FIG. 21 is an example of a UI that the UI control unit 451 displays in S2006. The differences in the UI illustrated in FIG. 21 relative to the UI 1700 illustrated in FIG. 17A that is described above in Embodiment 1 will now be described.

The UI 2100 includes an individual data information display region 2101, a button 2102 and a button 2103. In the individual data information display region 2101, a difference relative to the individual data information display region 1701 is that the date and time at which the association with the device ID of the device to be removed was removed is displayed. Thus the relation with the date and time of the operations when removing the MFP in S704 is easily conveyed to the person in charge of installation 722. Note that the individual data that is displayed in the individual data information display region 2101 is the individual data that was specified by the processing in S2005. That is, even when there are a plurality of individual data items with respect to which there is no association between the individual data and the device ID of a device to be removed, the individual data item with respect to which the operations in S704 were performed earliest is displayed as the object for importing. Therefore, if the installation operations are performed in the same order as the order in which the removal operations were performed, the necessity of selecting individual data is eliminated. The button 2102 and the button 2103 are the same as the button 1702 and the button 1703, respectively, and hence a description thereof is omitted here.

The description will now revert to FIG. 20. Since the processing in S2007 and S2008 is the same as in S1607 and S1608, respectively, a description thereof is omitted here.

In S2009, the UI control unit 451 displays a UI for selecting individual data. Thereafter, the processing transitions to S2010. Note that, in a case where the processing transitions from S2004 to S2009, in S2009 the UI control unit 451 displays a UI that is the same as the UI 1720 illustrated in FIG. 17B. Further, in a case where the processing transitions from S2007 to S2009, in S2009 the UI control unit 451 displays a UI that is the same as the UI 1720 illustrated in FIG. 17D.

Since the processing from S2010 to S2012 is the same as the processing from S1610 to S1612, a description thereof is omitted here.

Thus, according to the present embodiment, the automatic installation program 450 of the MFP 102 to be removed not only removes the association with the individual data that is associated with its own device, but also adds the time and order in which the association was removed. By this means, in a case where the person in charge of installation 722 performs the operations in S704 that are the operations for removing an MFP, and the operations for installing an MFP in the same order, the appropriate installation can be automatically implemented without selecting the individual data.

[Embodiment 3]

In Embodiment 1 and Embodiment 2, installation data is stored on the USB storage 103, and installation operations are performed using the USB storage 103 at the customer's premises. In Embodiment 3 an example is described in which installation is implemented by the MFP communicating with the case management server, and without using the USB storage 103. Note that, in Embodiment 3, differences relative to Embodiment 1 will be described.

<System Configuration in Embodiment 3>

Figure 22:
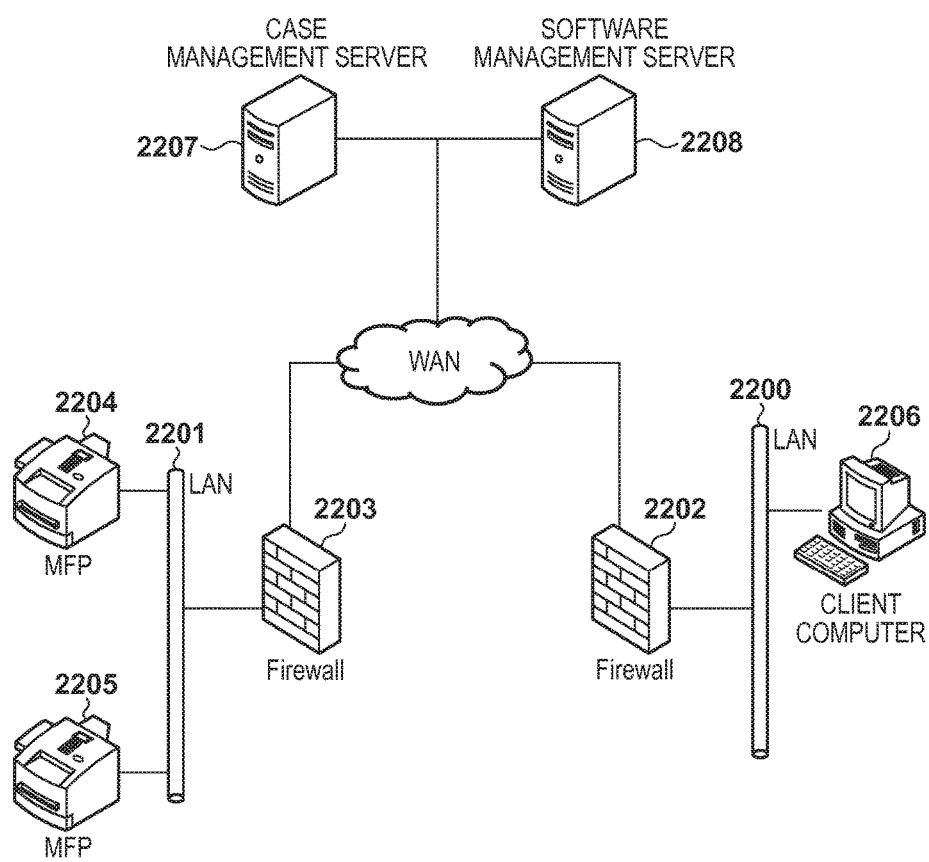
FIG. 22 is a view illustrating an example of the configuration of equipment in an automatic installation system according to Embodiment 3.

FIG. 22 is a view illustrating an example of the configuration of equipment in an automatic installation system according to Embodiment 3 of the present invention. The automatic installation system of Embodiment 3 includes a LAN 2200 at a place at which the sales representative and person in charge of installation perform operations, and a LAN 2201 at a customer's premises at which installation is performed. In FIG. 22 it is shown that the LAN 2200 and the LAN 2201 are separate LANs. Devices that are connected to the LAN 2200 and the LAN 2201 are each connected to a server on the Internet via a WAN through firewalls 2202 and 2203.

A client computer 2206 is connected to the LAN 2200 at the place where the sales representative and person in charge of installation perform operations. The client computer 2206 has the same hardware configuration and software configuration as the client computer 104.

An MFP 2204 to be installed and an MFP 2205 to be removed are connected to the LAN 2201 at the customer's premises. Note that, it is not the case that the MFP 2204 to be installed is initially connected to the LAN 2201, but rather the MFP 2204 is connected to the LAN 2201 during installation operations that are described later. Further, the MFP 2205 to be removed is disconnected from the LAN 2201 during removal operations that are described later. The MFP 2204 and the MFP 2205 have the same hardware configuration. The automatic installation program that is installed in the MFP 2204 and the MFP 2205 differs somewhat from the automatic installation program 450, and therefore will be described later using FIG. 23A.

A case management server 2207 has the same hardware configuration as the case management server 105. Note that, the case management server program that operates on the case management server 2207 differs somewhat from the case management server program 550, and therefore will be described later using FIG. 23B. A software management server 2208 has the same hardware configuration and software configuration as the software management server 106.

<Automatic Installation Program in Embodiment 3>

Figure 23A:
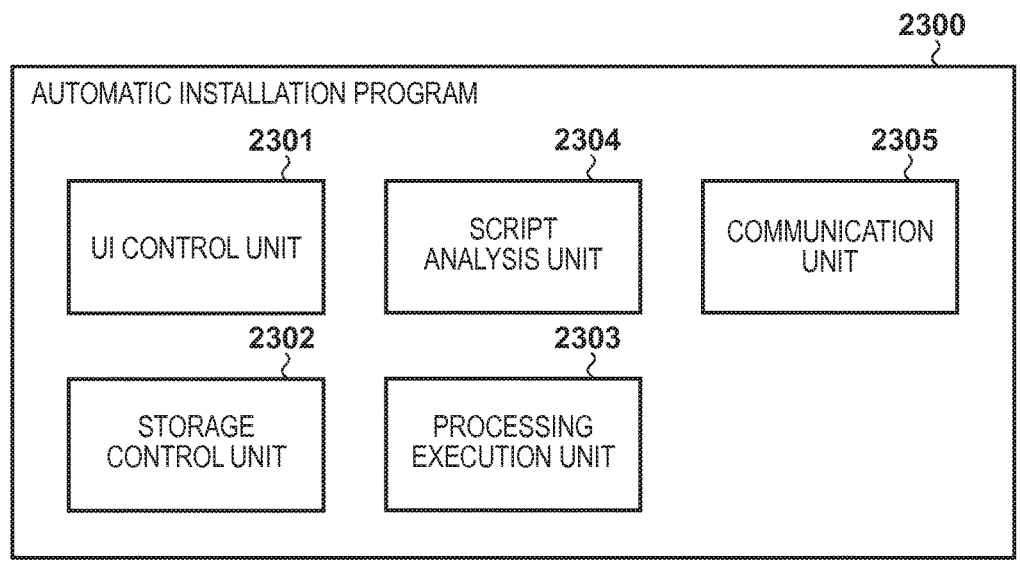
FIG. 23A and FIG. 23B are views illustrating the software configuration of an MFP and a case management server according to Embodiment 3.

FIG. 23A is a view illustrating the functional configuration of the automatic installation program that operates on the MFP 2204 and MFP 2205. In the present embodiment it is assumed that an automatic installation program 2300 is implemented as one extension program 407 of the MFP 2204 and MFP 2205. The respective functions are realized by the CPU 201 that executes programs corresponding to the respective functions. Portions of the automatic installation program 2300 that are different from the automatic installation program 450 will be described.

The automatic installation program 2300 includes a UI control unit 2301, a storage control unit 2302, a processing execution unit 2303, a script analysis unit 2304 and a communication unit 2305. The units from the UI control unit 2301 to the script analysis unit 2304 are the same as the respective units from the UI control unit 451 to the script analysis unit 454 of the automatic installation program 450. Note that, in a case where the storage control unit 2302 does not provide an installation function that uses the USB storage that is described in Embodiment 1, the storage control unit 2302 is not an essential component.

The communication unit 2305 transmits data to the case management server 2207 and acquires data therefrom in accordance with instructions of the processing execution unit 2303. Examples of the data which the communication unit 2305 transmits include the device ID of its own device. Examples of the data which the communication unit 2305 acquires include case data. Further, in accordance with an instruction of the processing execution unit 2303, the communication unit 2305 acquires various kinds of software such as firmware or a license file from the software management server 2208.

<Case Management Server Program in Embodiment 3>

Figure 23B:
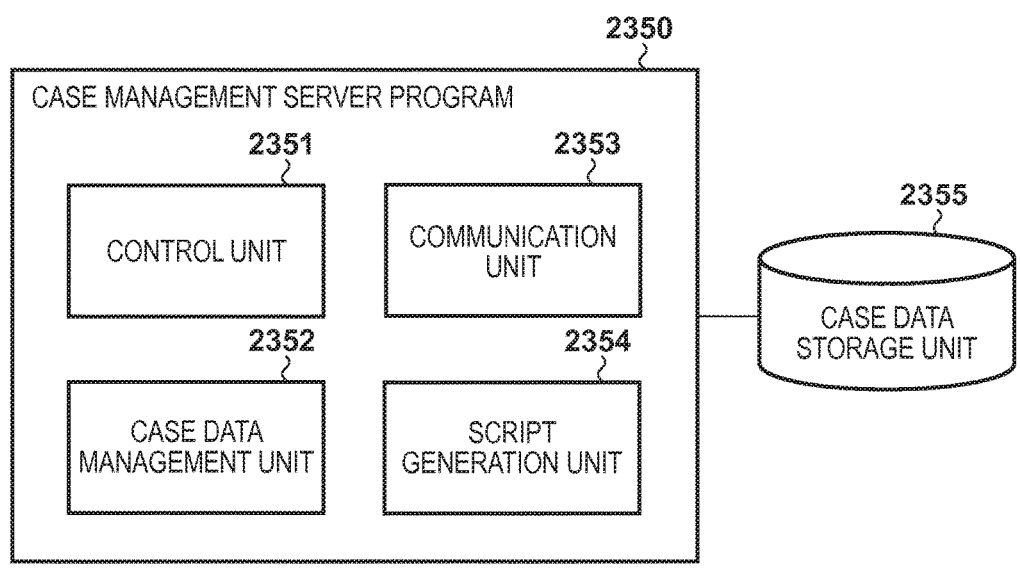

FIG. 23B is a view that illustrates an example of the functional configuration of the case management server program 2350 that operates on the case management server 2207. The respective functions are realized by the CPU 301 executing a program. Portions of the case management server program 2350 that are different from the case management server program 550 will be described. The case management server program 2350 is a Web application that has a control unit 2351, a case data management unit 2352, a communication unit 2353, and a script generation unit 2354. The functions from the control unit 2351 to the communication unit 2353 are the same as the respective functions from the control unit 551 to the communication unit 553 of the case management server program 550. Further, the case data storage unit 2355 is the same database as the case data storage unit 554.

In accordance with an instruction of the control unit 2351, the script generation unit 2354 generates an installation script that can be analyzed by the automatic installation program 2300, based on case data that is stored in the case data storage unit 2355.

<MFP Replacement Operations Procedure in Embodiment 3>

FIG. 24 is a workflow diagram that illustrates a workflow of the basic installation of the MFPs 2204 according to Embodiment 3 of the present invention. In the present example, a case is described of replacing MFPs 2205 with MFPs 2204. Note that, with respect to FIG. 24, only portions that are different from FIG. 7A and FIG. 7B will be described. The operations in S2401 and S2402 are the same as in S701 and S702, and hence a description thereof is omitted here. Unlike Embodiment 1 and Embodiment 2, according to Embodiment 3 a person in charge of installation 2422 goes to the customer's premises without bringing a USB storage.

Reference character S2403 denotes operations that the person in charge of installation 2422 performs when removing the MFPs 2205 at the customer's premises. The person in charge of installation 2422 presses a button for removing the relevant MFP 2205 on a UI that the automatic installation program 2300 of the MFP 2205 displays. Note that, the UI displayed at this time is the same as the UI 1450 illustrated in FIG. 14B. In this case, the person in charge of installation 2422 presses the "Remove" button 1452. Upon detecting that the button 1452 was pressed, the automatic installation program 2300 executes processing for a time of removal. The processing for a time of removal will be described later using FIG. 25. Thereafter, the person in charge of installation 2422 actually removes the MFP 2205. At this time, the connection of the MFP 2205 to the LAN 2201 of the customer's premises is disconnected.

Reference character S2404 denotes operations the person in charge of installation 2422 performs at the customer's premises when actually installing the MFPs 2204. When the MFPs 2204 are delivered from the warehouse, the person in charge of installation 2422 positions the MFPs 2204 at the places requested by the customer. Subsequently, the person in charge of installation 2422 connects the relevant MFP 2204 to the LAN 2201 of the customer's premises. Note that, although in the present example the installation operations are performed after the MFP 2204 is connected to the LAN 2201 of the customer's premises, as long as communication can be performed with the case management server 2207 and the software management server 2208, it is not necessarily required to connect the MFP 2204 to the LAN 2201 of the customer's premises for the installation operations. For example, a configuration may be adopted in which the MFP 2204 has a wireless communication function, and communicates with the case management server 2207 and the software management server 2208 using a tethering function of a portable terminal or the like. The person in charge of installation 2422 presses the button for installation on a UI that the automatic installation program 2300 of the MFP 2204 displays. Note that, the UI displayed at this time is the same as the UI 1450 illustrated in FIG. 14B. In this case, the person in charge of installation 2422 presses the "Install" button 1451. Upon detecting that the button 1451 was pressed, the automatic installation program 2300 executes processing for a time of installation. The processing for a time of installation will be described later using FIG. 26. Further, it is desirable that the removal of a device to be removed and the installation of a device to be installed are alternately performed one set at a time in a similar manner to Embodiment 1 and Embodiment 2. By performing removal and installation in this manner, it is not necessary to specify an individual data file when importing individual data.

The operations to replace all of the MFPs are completed by repeating the operations in S2403 and S2404 a number of times that corresponds to the total number of MFPs. The foregoing is a workflow of the basic installation of the MFPs 2204 according to Embodiment 3 of the present invention. Note that, in Embodiment 1, although the operations after installation were described using FIG. 7B, the operations illustrated in FIG. 7B are not necessary in Embodiment 3. During the operations in S2404, similar processing is performed by the automatic installation program 2300 and by the case management server program 2350.

Next, the processing of the automatic installation program 2300 and the case management server program 2350 during the operations in S2403 and S2404 will be described using FIG. 25 and FIG. 26. Note that, during the operations in S2403 and S2404, upon the automatic installation program being started up, the automatic installation program 2300 executes the processing described in FIG. 14A and displays the UI 1450.

<Processing by Automatic Installation Program in Embodiment 3>

Figure 25:
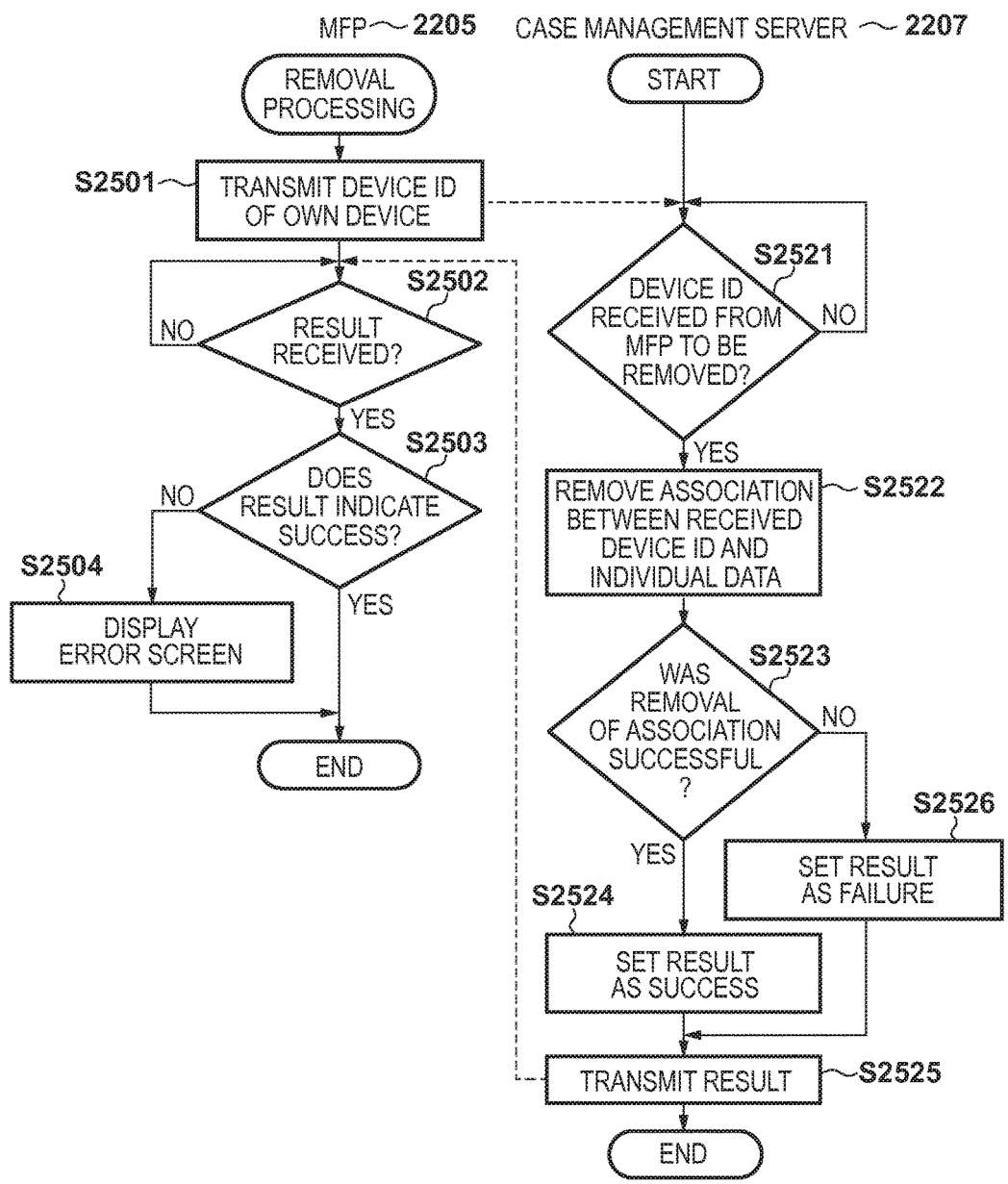
FIG. 25 is a flowchart illustrating removal processing according to Embodiment 3.
Figure 26:
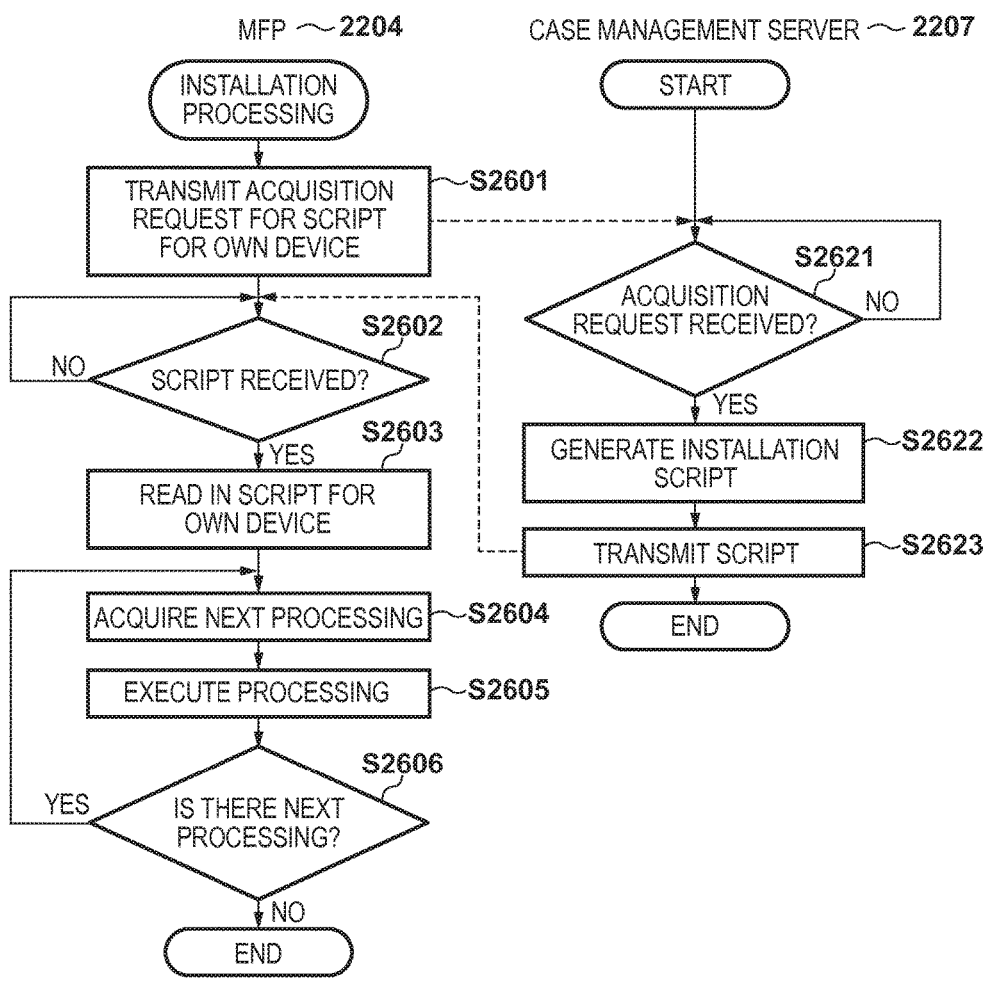
FIG. 26 is a flowchart illustrating installation processing according to Embodiment 3.

FIG. 25 is a flowchart that describes processing that the automatic installation program 2300 and the case management server program 2350 execute when it is detected that the "Remove" button 1452 of the UI 1450 was pressed. That is, the flowchart in FIG. 25 describes the processing in S1404 of Embodiment 3. Reference characters S2501 to S2504 denote processing by the automatic installation program 2300.

In S2501, the communication unit 2305 of the automatic installation program 2300 transmits the device ID of its own device to the case management server program 2350 of the case management server 2207, and the processing transitions to S2502.

In S2502, the communication unit 2305 of the automatic installation program 2300 monitors whether or not a result is received. If a result is received, the processing transitions to S2503. If a result is not received, the communication unit 2305 continues the monitoring operation.

In S2503, the processing execution unit 2303 determines whether or not the result received in S2502 is to the effect that transmission was successful. If the result is that transmission was successful, the processing execution unit 2303 ends the processing. If the result is to the effect that transmission failed, the processing transitions to S2504.

In S2504, the UI control unit 2301 displays an error screen to convey a message to the effect that transmission of the device ID failed, and thereafter the processing ends.

Reference characters S2521 to S2526 denote processing of the case management server program 2350. In S2521, the communication unit 2353 of the case management server program 2350 monitors whether or not a device ID is received from an MFP to be removed. If a device ID is received, the processing transitions to S2522. Here, since the device ID of the device to be removed was stored in the case data storage unit 554 in S2401, a determination as to whether or not the received device ID is a device ID of a device to be removed can be performed by comparing the received device ID with the device ID of the device to be removed that was stored in the case data storage unit 554 in S2401.

In S2522, the case data management unit 2352 receives an instruction from the control unit 2351 and removes the association between the device ID received in S2351, and thereafter the processing transitions to S2523. More specifically, the case data management unit 2352 updates a value in the column 675 of the individual data management table of the case data storage unit 2355. In a case where the device ID received in S2351 and a value in the column 675 are the same, the case data management unit 2352 deletes the value in the column 675 for the corresponding record.

In S2523, the control unit 2351 determines whether removal of the association by the processing in S2522 succeeded. If removal of the association succeeded, the processing transitions to S2524. If removal of the association failed, the processing transitions to S2526. Note that, cases in which removal of the association fails include, naturally, a case where updating of the database fails, and also a case where the device ID received in S2521 does not match any value in the column 675.

In S2524, the control unit 2351 sets the result to be transmitted to the MFP 2205 to a result indicating the processing was successful. The processing thereafter transitions to S2525.

In S2525, the communication unit 2353 transmits the result to the automatic installation program 2300 of the MFP 2205, and ends the processing.

In S2526, the control unit 2351 sets the result to be transmitted to the MFP 2205 to a result indicating the processing failed, and the processing transitions to S2525.

Next, processing of the programs at a time of installation will be described using FIG. 26 and FIG. 27. FIG. 26 is a flowchart describing processing that the automatic installation program 2300 and the case management server program 2350 execute when it is detected that the "Install" button 1451 of the UI 1450 was pressed. That is, FIG. 26 is a flowchart describing the processing in S1405 in Embodiment 3. Note that, differences in FIG. 26 relative to the processing of the flowchart illustrated in FIG. 15B will be described hereunder. Reference characters S2601 to S2606 denote processing of the automatic installation program 2300.

In S2601, the communication unit 2305 of the automatic installation program 2300 receives an instruction from the processing execution unit 2303, and transmits an acquisition request for acquisition of an installation script to the case management server program 2350 of the case management server 2207. The processing thereafter transitions to S2602. Note that, the acquisition request includes the device ID of its own device so that the case management server program 2350 of the case management server 2207 can determine which MFP installation script the communication unit 2305 of the automatic installation program 2300 wishes to acquire.

In S2602, the communication unit 2305 of the automatic installation program 2300 monitors whether or not an installation script is received from the case management server 2207. If an installation script is received, the processing transitions to S2603.

The processing from S2603 to S2606 is executed in accordance with the contents described in the installation script in a similar manner to the processing from S1552 to S1555.

Reference characters S2621 to S2623 denote processing of the case management server program 2350. In S2621, the communication unit 2353 of the case management server program 2350 monitors whether or not an acquisition request for acquisition of an installation script is received. If an acquisition request is received, the processing transitions to S2622. If an acquisition request is not received, the communication unit 2353 continues the monitoring operation.

In S2622, the script generation unit 2354 of the case management server program 2350 generates an installation script based on information of the case data that is stored in the case data storage unit 2355. Thereafter the processing transitions to S2623. The script generation unit 2354 determines which MFP to generate an installation script for based on the device ID that is included in the acquisition request received in S2621. The installation script that the script generation unit 2354 generates in S2622 is approximately the same as the installation script 1200. The differences between the installation script generated in S2622 relative to the installation script 1200 are the paths defined in the respective processing portions of the process describing part 1210. Taking the firmware updating processing part 1203 as an example, the term "path" mentioned here refers to the <dirPath> tag. In Embodiment 1, the paths defined in the respective processing portions of the process describing part 1210 are relative paths from the root folder 110 of the USB storage 103. In Embodiment 3, a configuration is adopted in which the relevant data files are acquired from respective servers without using the USB storage 103. Consequently, in the installation script generated in S2622, a URL (Uniform Resource Locator) of a service that the respective servers provide is described in the path defined by the respective processing portions. For example, taking the firmware updating processing part 1203 as an example, the URL of a Web service for acquiring firmware that the software management server 2208 makes publicly available is described in the <dirPath>. By this means, when executing the processing of the firmware updating processing part 1203 in S2605, the automatic installation program 2300 of the MFP 2204 acquires and imports firmware from the software management server 2208 in which an installation script is described.

In S2623, the communication unit 2353 of the case management server program 2350 transmits the installation script generated in S2622 to the automatic installation program 2300 of the MFP 2204.

<Device Settings Information Import Processing in Embodiment 3>

Figure 27:
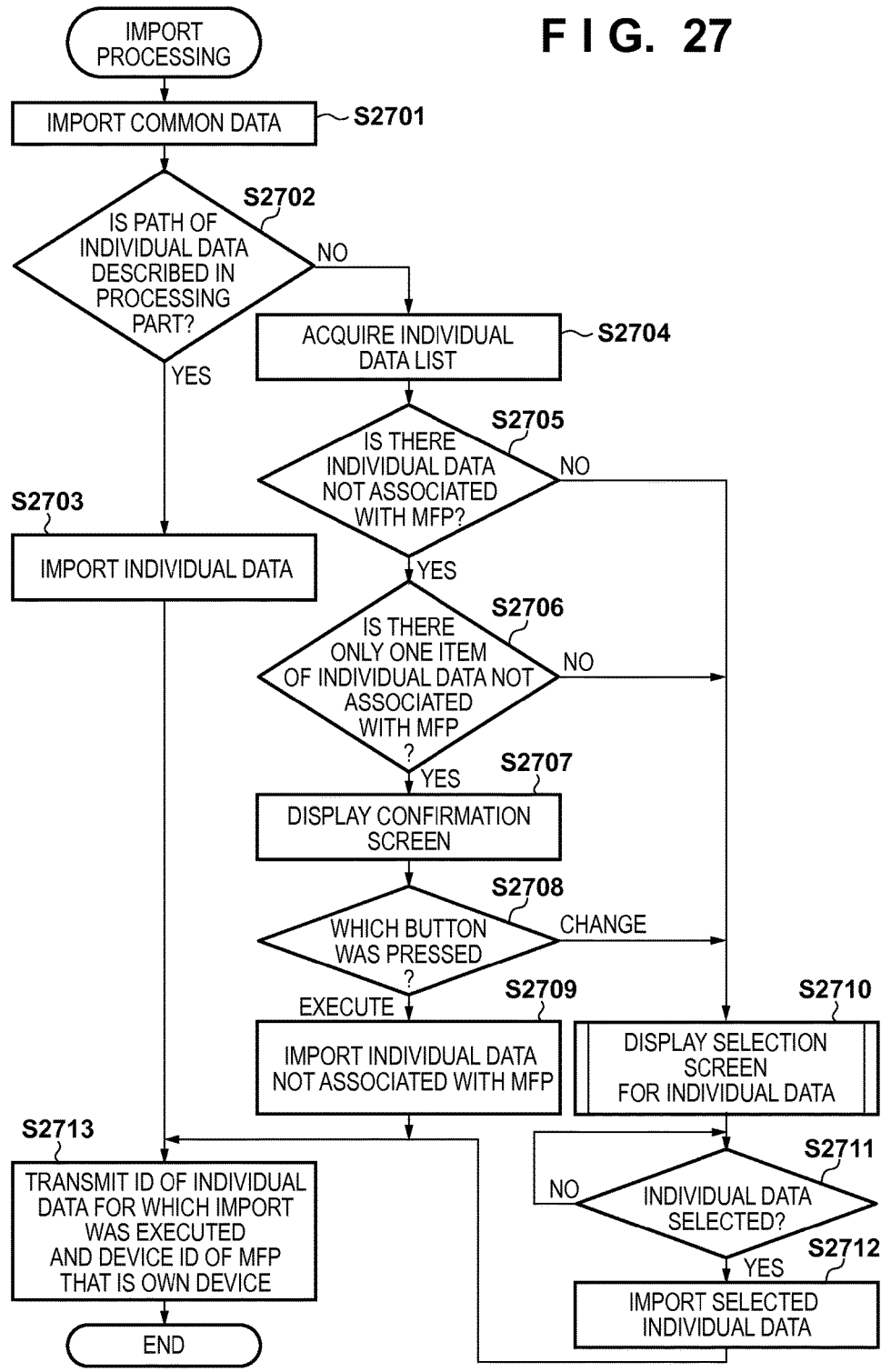
FIG. 27 is a flowchart illustrating processing for importing device setting information according to Embodiment 3.

FIG. 27 is a flowchart illustrating processing of the automatic installation program 2300 in a case where the processing executed in S2605 is processing to import device settings information. Note that only processing in FIG. 27 that is different from the processing in FIG. 16 will be described.

In S2701, the processing execution unit 2303 performs importing of common data, and transitions to S2702. As described above, in the installation script according to Embodiment 3, the URL of a service of respective servers is described in the respective paths. Therefore, the communication unit 2305 of the automatic installation program 2300 acquires the common data from the case management server 2207 by accessing a URL that is specified in the <dirPath> tag of the device settings information import processing part 1207.

The processing in S2702 is the same as in S1602. The processing execution unit 2303 determines whether a path of individual data is described in the process describing part 1210. If a path of individual data is described, the processing branches to S2703.

In S2703, the processing execution unit 2303 performs importing of the individual data, and transitions to S2713. With respect to the individual data also, similarly to S2701, the communication unit 2305 of the automatic installation program 2300 acquires the individual data from the case management server 2207 by accessing a URL that is specified by the <dirPath> tag of the device settings information import processing part 1207.

In S2704, the communication unit 2305 of the automatic installation program 2300 acquires a list of individual data from the case management server program 2350 of the case management server 2207, and the processing transitions to S2705. Note that, in S2704 it is not necessary to acquire the substance of the individual data. It is sufficient to acquire information for displaying on a UI that is described later and information regarding an association with an MFP. For example, among the columns that are managed in the individual data management table 670, the information from the column 671 to the column 675 is acquired, and the information regarding the substance in the column 676 is not acquired.

Since the processing from S2705 to S2708 is the same as the processing from S1604 to S1607, a description thereof is omitted here. Briefly, if there is one item of individual data that is not associated with an MFP, that individual data is displayed and the processing execution unit 2303 waits for instruction to execute importing of the individual data or to change the display of individual data. If an instruction to execute importing of the individual data is received, the processing branches to S2709.

In S2709, the processing execution unit 2303 executes importing of the individual data that is not associated with a device ID of a device to be removed that was displayed in the UI display region 1701, and transitions to S2313. Note that, the individual data selected on the UI 1700 is acquired from the case management server 2207 by the communication unit 2305 of the automatic installation program 2300.

Since the processing in S2710 and S2711 is the same as the processing in S1609 and S1611, a description thereof is omitted here. Briefly, a list of individual data candidates is displayed, and the processing execution unit 2303 waits for individual data to be selected from the list.

In S2712, the processing execution unit 2303 executes processing to import the individual data with respect to which selection was detected in S2711, and transitions to S2713. Note that, the individual data with respect to which selection was detected in S2711 is acquired from the case management server 2207 by the communication unit 2305 of the automatic installation program 2300.

In S2713, the communication unit 2305 of the automatic installation program 2300 transmits the individual data ID of the individual data for which importing was executed and the device ID of its own device to the case management server program 2350 of the case management server 2207, and the processing ends. Upon receiving the individual data ID of the individual data and the device ID of the MFP, the case management server program 2350 updates the associations between individual data and device IDs of devices to be installed. More specifically, the case data management unit 2352 updates the individual data management table 670 of the case data storage unit 2355. The content of the update is the addition of the received device ID of the MFP to the column 674 of the record of the individual data that is specified by the received individual data ID. By executing the processing described in S2713, an association between the individual data and the device ID of the device to be installed is also made in the case data that is managed by the case management server program 2350. The operations after performing installation that are illustrated in FIG. 7B in Embodiment 1 are not necessary in Embodiment 3.

As described in the foregoing, according to the present embodiment an appropriate installation can be automatically implemented without using a USB storage during installation of an MFP to replace an existing MFP.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140002, filed Jul. 7, 2014 which is hereby incorporated by reference herein in its entirety.

What is claimed is:

1. An image forming apparatus, comprising:
at least one processor coupled to a memory device and programmed to provide:
an access unit for accessing a storage unit that stores setting information of each of a plurality of image forming apparatuses and an identifier of each image forming apparatus associated with the setting information of the image forming apparatus, wherein the association between the setting information and the identifier is made for each of the plurality of image forming apparatuses;
a display control unit for displaying a selection screen for allowing a user to select removal of an image forming apparatus or installation of an image forming apparatus;
a first determination unit for determining, if the removal of an image forming apparatus is selected via the selection screen, whether or not the setting information associated with the identifier corresponding to the identifier of the image forming apparatus to be removed is included in the setting information of the plurality of image forming apparatuses stored in the storage unit;
a removal unit for removing the association between the identifier of the image forming apparatus to be removed and the setting information associated with that identifier stored in the storage unit, if it is determined by the first determination unit that the setting information associated with the identifier corresponding to the identifier of the image forming apparatus to be removed is included in the setting information of the plurality of image forming apparatuses stored in the storage unit;
a second determination unit for determining, if the installation of an image forming apparatus is selected via the selection screen, whether or not setting information which is not associated with any identifier of an image forming apparatus is included in the setting information of the plurality of image forming apparatuses stored in the storage unit;
an import unit for importing the setting information which is not associated with any identifier into the image forming apparatus to be installed, if it is determined by the second determination unit that the setting information which is not associated with any identifier of an image forming apparatus is included in the setting information of the plurality of image forming apparatuses stored in the storage unit; and
an associating unit for associating the identifier of the image forming apparatus into which the setting information has been imported with the setting information stored in the storage unit that was imported into the image forming apparatus.

2. The image forming apparatus according to claim 1, wherein, in a case where installation of the image forming apparatus is selected and no setting information which is not associated with an identifier of an image forming apparatus is included in the setting information stored in the storage unit, the import unit imports setting information of one of the plurality of image forming apparatuses that is selected from among the setting information of the plurality of image forming apparatuses.

3. The image forming apparatus according to claim 1, wherein, in a case where installation of the image forming apparatus is selected and the setting information stored in the storage unit includes setting information for two or more image forming apparatuses which is not associated with an identifier of an image forming apparatus, the processing unit imports setting information that is selected from among the setting information for two or more image forming apparatuses which is not associated with an identifier of an image forming apparatus stored in the storage unit.

4. The image forming apparatus according to claim 1, wherein:
the import unit comprises a changing unit for changing the setting information which is not associated with an identifier of an image forming apparatus that is to be imported, before importing the setting information; and
the changing unit imports setting information that is selected from among setting information included in the association information.

5. The image forming apparatus according to claim 2, wherein the import unit comprises a unit that displays a user interface for selecting the setting information to be imported.

6. The image forming apparatus according to claim 1, wherein, in a case where removal of the image forming apparatus is selected by the selection unit, the removal unit removes an association between an identifier of the image forming apparatus and the setting information that is stored in the storage unit, and also stores, by the storage unit, an order in which the association between the identifier of the image forming apparatus and the setting information is removed stored in the storage unit, and in a case where installation of the image forming apparatus is selected by the selection unit, the import unit imports setting information of which association with the identifier of the image forming apparatus was removed earliest in order among the setting information that is not associated with an identifier of an image forming apparatus that are stored in the storage unit.

7. The image forming apparatus according to claim 1, wherein the storage unit is a removable storage medium or an information processing apparatus.

8. The image forming apparatus according to claim 1, wherein the selection unit comprises a unit that displays a user interface for selecting removal or installation of an image forming apparatus.

9. The image forming apparatus according to claim 1, wherein the import unit and the removal unit are realized by using the at least one processor that the image forming apparatus comprises to interpret and execute a script that is stored together with the association information.

10. The image forming apparatus according to claim 1, further comprising a second display control unit for displaying a second selection screen for allowing a user to select the setting information to be installed in the image forming apparatus, if it is determined by the second determination unit that the setting information which is not associated with any identifier of the image forming apparatus is not included in the setting information of the plurality of image forming apparatuses stored the storage unit.

11. A non-transitory computer-readable storage medium storing a program that when executed causes a computer to function as an image forming apparatus, the program comprising:
accessing, a storage unit that stores setting information of each of a plurality of image forming apparatuses and an identifier of each image forming apparatus associated with the setting information of the image forming apparatus, wherein the association between the setting information and the identifier is made for each of the plurality of image forming apparatuses;
displaying a selection screen for allowing a user to select removal of an image forming apparatus or installation of an image forming apparatus;
determining, if the removal of an image forming apparatus is selected via the selection screen, whether or not the setting information associated with the identifier corresponding to the identifier of the image forming apparatus to be removed is included in the setting information of the plurality of image forming apparatuses stored in the storage unit;
removing the association between the identifier of the image forming apparatus to be removed and the setting information associated with that identifier stored in the storage unit, if it is determined that the setting information associated with an identifier corresponding to the identifier of the image forming apparatus to be removed is included in the setting information of the plurality of image forming apparatuses stored in the storage unit;

determining, if the installation of an image forming apparatus is selected via the selection screen, whether or not setting information which is not associated with any identifier of an image forming apparatus is included in the setting information of the plurality of image forming apparatuses stored the storage unit;

importing the setting information which is not associated with any identifier into the image forming apparatus to be installed, if it is determined that the setting information which is not associated with any identifier of an image forming apparatus is included in the setting information of the plurality of image forming apparatuses stored the storage unit; and associating the identifier of the image forming apparatus into which the setting information has been imported with the setting information stored in the storage unit that was imported into the image forming apparatus.

12. An automatic installation method that is implemented by an image forming apparatus comprising:

accessing a storage unit that stores setting information of each of a plurality of image forming apparatuses and an identifier of each image forming apparatus associated with the setting information of the image forming apparatus, wherein the association between the setting information and the identifier is made for each of the plurality of image forming apparatuses;

displaying a selection screen for allowing a user to select removal of an image forming apparatus or installation of an image forming apparatus;

determining, if the removal of an image forming apparatus is selected via the selection screen, whether or not the setting information associated with the identifier corresponding to the identifier of the image forming apparatus to be removed is included in the setting information of the plurality of image forming apparatuses stored in the storage unit;

removing the association between the identifier of the image forming apparatus to be removed and the setting information associated with that identifier stored in the storage unit, if it is determined that the setting information associated with the identifier corresponding to the identifier of the image forming apparatus to be removed is included in the setting information of the plurality of image forming apparatuses stored in the storage unit;

determining, if the installation of an image forming apparatus is selected via the selection screen, whether or not setting information which is not associated with any identifier of an image forming apparatus is included in the setting information of the plurality of image forming apparatuses stored the storage unit;

importing the setting information which is not associated with any identifier into the image forming apparatus to be installed, if it is determined that the setting information which is not associated with any identifier of an image forming apparatus is included in the setting information of the plurality of image forming apparatuses stored the storage unit; and associating the identifier of the image forming apparatus into which the setting information has been imported with the setting information stored in the storage unit that was imported into the image forming apparatus.

* * * * *